United States Patent
Okada et al.

(10) Patent No.: US 7,558,435 B2
(45) Date of Patent: Jul. 7, 2009

(54) SIGNAL PROCESSING APPARATUS, METHOD OF PROCESSING A SIGNAL, RECORDING MEDIUM, AND PROGRAM

(75) Inventors: Shintaro Okada, Tokyo (JP); Kazuhiko Ueda, Kanagawa (JP); Mitsuyasu Asano, Tokyo (JP); Takeshi Kubozono, Kanagawa (JP); Kazuki Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 747 days.

(21) Appl. No.: 10/805,207

(22) Filed: Mar. 22, 2004

(65) Prior Publication Data

US 2004/0246378 A1    Dec. 9, 2004

(30) Foreign Application Priority Data

Mar. 24, 2003  (JP)  ............................. 2003-080440
Mar. 24, 2003  (JP)  ............................. 2003-080441

(51) Int. Cl.
  *G06K 9/40*   (2006.01)
  *H04N 5/00*   (2006.01)
  *H04N 5/21*   (2006.01)

(52) U.S. Cl. ....................... 382/266; 362/260; 362/263; 362/264; 348/606; 348/625; 348/627

(58) Field of Classification Search ................. 348/606, 348/625, 627; 382/261, 264, 266, 260, 263
See application file for complete search history.

(56) References Cited

U.S. PATENT DOCUMENTS

| | | | | |
|---|---|---|---|---|
| 5,442,407 A | * | 8/1995 | Iu | .............................. 348/620 |
| 5,442,426 A | * | 8/1995 | Yamamura et al. | .......... 399/241 |
| 6,285,798 B1 | * | 9/2001 | Lee | ............................. 382/260 |
| 6,529,622 B1 | * | 3/2003 | Pourjavid | .................... 382/149 |
| 6,895,124 B1 | * | 5/2005 | Kira et al. | .................... 382/260 |
| 6,907,144 B1 | * | 6/2005 | Gindele | ....................... 382/275 |
| 7,068,852 B2 | * | 6/2006 | Braica | ......................... 382/266 |
| 7,072,525 B1 | * | 7/2006 | Covell | ......................... 382/261 |
| 2001/0038716 A1 | * | 11/2001 | Tsuchiya et al. | ............. 382/261 |
| 2004/0008902 A1 | * | 1/2004 | Nakajima et al. | ........... 382/260 |

FOREIGN PATENT DOCUMENTS

| | | |
|---|---|---|
| JP | 7-170406 | 7/1995 |
| JP | 7-288768 | 10/1995 |
| JP | 2001-298621 | 10/2001 |
| JP | 2003-8898 | 1/2003 |

\* cited by examiner

*Primary Examiner*—Matthew C Bella
*Assistant Examiner*—Michael A Newman
(74) *Attorney, Agent, or Firm*—Oblon, Spivak, McClelland, Maier & Neustadt, P.C.

(57) ABSTRACT

In each of stages of a nonlinear filter, a successively determined target signal and plural adjacent signals are weighted-averaged with plural sets of different coefficients to calculate plural smoothed signals. Differences in level between the target signal and each of adjacent signals and signals arranged within the predetermined interval from the each of the adjacent signals are compared with a threshold value. According to the comparison, flags are set to the adjacent signal, to an adjacent signal arranged at a symmetrical position, and to adjacent signals arranged beyond the adjacent signals. The intervals of adjacent signals are different among stages. The target signal in level is used instead of the adjacent signals with smoothed signals, which are selected according to the flags. Weighting coefficients may be calculated on the basis of the comparison result, and smoothed signals may be synthesized according to the weighting coefficients.

13 Claims, 14 Drawing Sheets

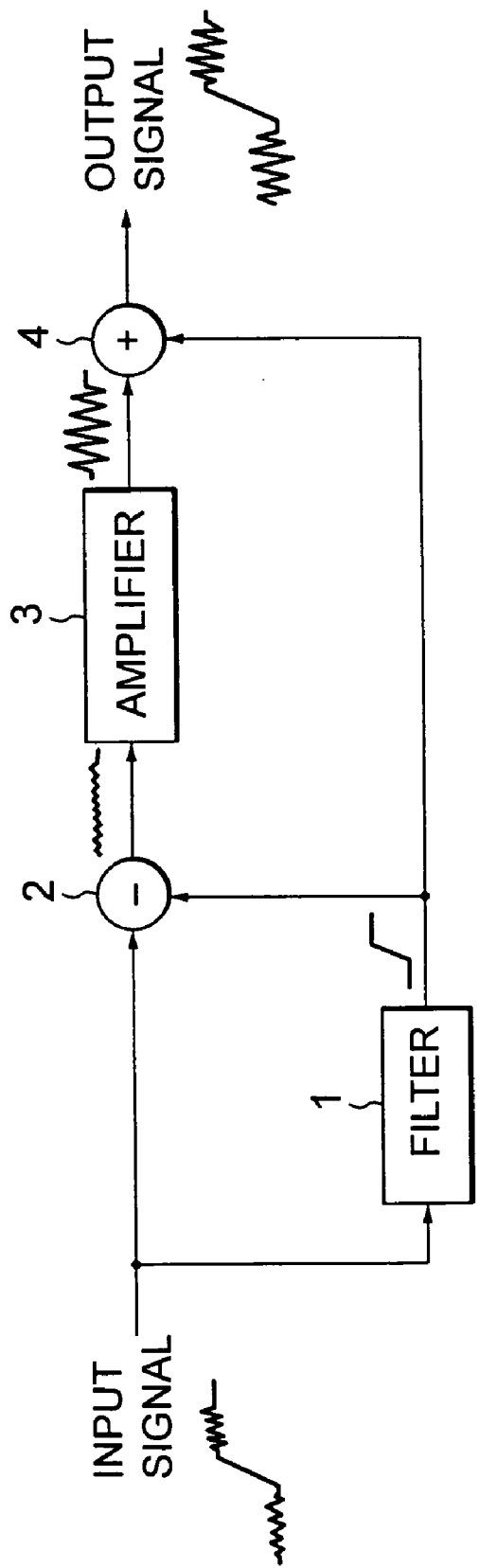

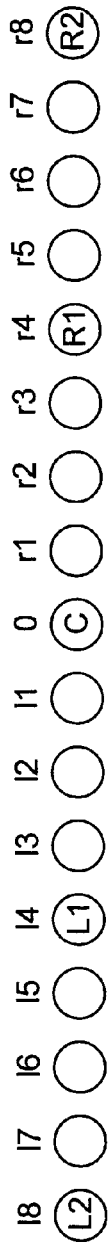
Fig. 14
Fig. 15
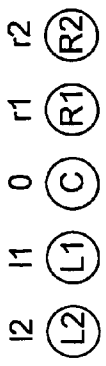
Fig. 16
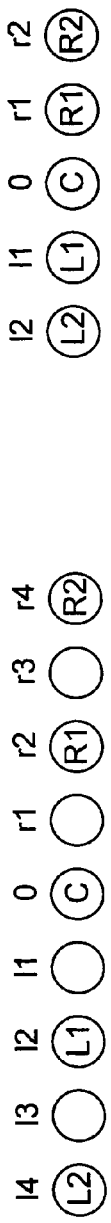
| SMOOTHED SIGNAL | TAP COEFFICIENTS |
|---|---|
| F11<br>F21<br>F31 | { 0,0,1,0,0 } |
| F13<br>F23<br>F33 | { 0,1,2,1,0 } |
| F15<br>F25<br>F35 | { 1,2,2,2,1 } |
Fig. 17

Fig. 19
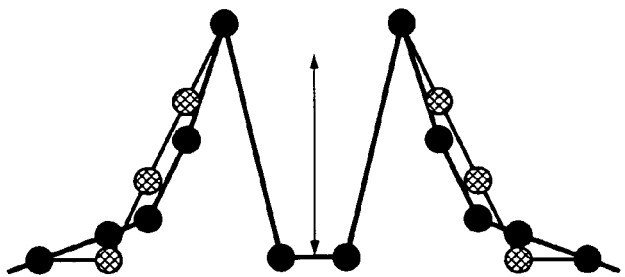
Fig. 20
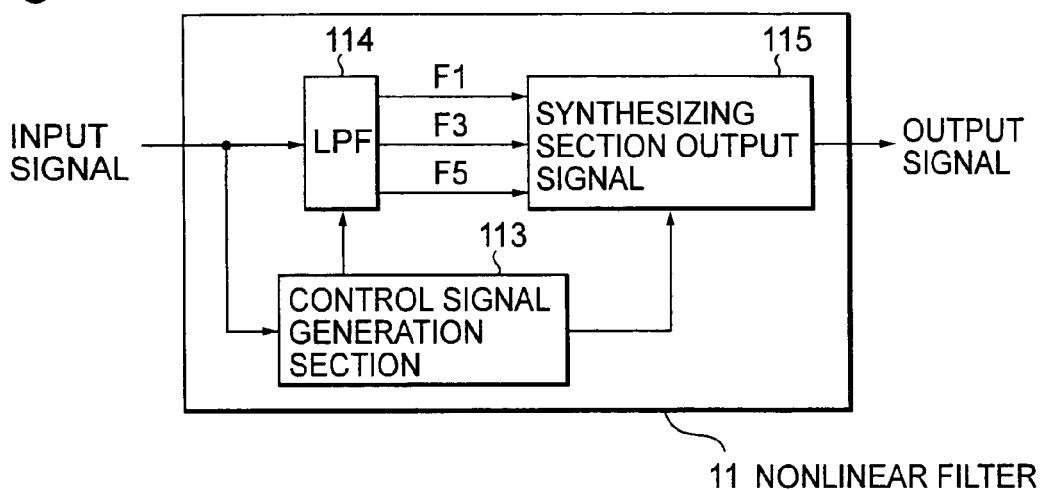
11 NONLINEAR FILTER
Fig. 21   (L2) (L1) (C) (R1) (R2)
Fig. 22
| SMOOTHED SIGNAL | TAP COEFFICIENTS |
|---|---|
| F1 | { 0,0,1,0,0 } |
| F3 | { 0,1,2,1,0 } |
| F5 | { 1,2,2,2,1 } |

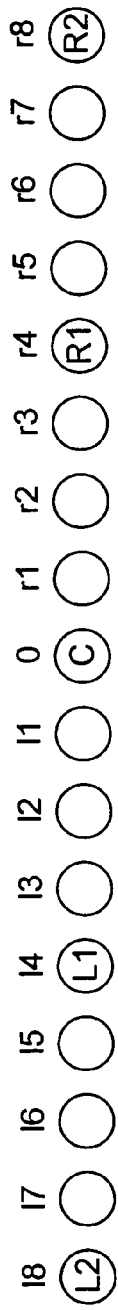
Fig. 30
Fig. 31
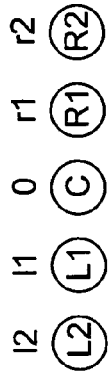
Fig. 32
Fig. 33

SIGNAL PROCESSING APPARATUS, METHOD OF PROCESSING A SIGNAL, RECORDING MEDIUM, AND PROGRAM

CROSS REFERENCE TO RELATED APPLICATIONS

The present document is based on Japanese Priority Applications JP2003-080440 and JP2003-080441, both filed in the Japanese Patent Office on Mar. 24, 2003, the contents in which being incorporated herein by reference to the extent permitted by law.

BACKGROUND OF THE INVENTION

1. Field of the Invention

This invention relates to a signal processing apparatus, a method of processing signals, a recording medium recording a signal process, and a program for processing signals, and relates, for example, to a signal processing apparatus, a method of processing signals, a recording medium recording a signal process, and a program for processing signals, preferably used for enhancing texture surrounded by edges, without excessively enhancing the edges within an image.

2. Related Art

Conventionally, methods of enhancing contrast by converting gradation and methods of enhancing high frequency components are known to improve contrast (difference in brightness) and sharpness (clearness at an edge) in an image generated by an imaging element such as CCD (Charge Coupled Device), and CMOS (Complementary Metal-Oxide Semiconductor) in video cameras and the like.

As a contrast enhancement method, tone curve adjustment methods are known for converting a pixel level of each pixel with a function having a predetermined input-output relation (hereinafter this is referred to as level conversion function), and further, histogram equalization methods are known for adaptively changing a level conversion function in accordance with frequency distribution of pixel levels.

As high frequency component enhancement methods, a method called "unsharp mask" is known for extracting an edge and enhancing the extracted edge.

SUMMARY OF THE INVENTION

However, in the contrast enhancement methods, there is a problem that out of the entire dynamic range (difference between the maximum and minimum levels) of an image, contrast is improved only at a part of the brightness region. In addition, there is another problem that contrast decreases at the brightest and darkest areas on the image in the case of the tone curve adjustment, and in the case of the histogram equalization, contrast decreases at areas with brightness of which the frequency distribution is low. Further in the high frequency component enhancement method, contrast is enhanced only at high frequency components of the image, so that there is a further problem that an area around an edge is unnaturally enhanced, and thus the quality of the image is deteriorated.

To improve this, a method of enhancing areas other than edges is known in which input image data at areas other than an edge is amplified with the slope of an edge being kept. FIG. 1 shows a picture signal processing apparatus provided for this method. For example, Japanese Laid-Open patent application No. 2001-298621 discloses such method.

In the picture signal processing apparatus shown in FIG. 1, an input picture signal is supplied to an $\epsilon$ filter 1, and a subtractor 2. When the $\epsilon$ filter 1 is supplied with the picture signal representing an edge and level slightly varying portions before and after the edge as shown in FIG. 2A, the $\epsilon$ filter 1 converts it into a converted picture signal in which only an edge is extracted as shown in FIG. 2B and supplies the converted picture signal to the subtractor 2 and an adder 4.

The process in the $\epsilon$ filter 1 will be described in detail with reference to FIGS. 3 and 4. The $\epsilon$ filter 1 successively determines one target pixel C from respective pixels in the inputted image and as shown in FIG. 3, sets taps for adjacent pixels successively arranged in the horizontal direction around the target pixel C (in FIG. 3, six pixels L3, L2, L1, R1, R2, and R3). Then, the $\epsilon$ filter 1 obtains a weighted means value of the pixel values of the target pixel C and the adjacent pixels for the taps with tap coefficients (for example, {1, 2, 3, 4, 3, 2, 1} and outputs the result as a conversion result C' corresponding to the target pixel C.

$$C'=(1 \cdot L3+2 \cdot L2+3 \cdot L1+4 \cdot C+3 \cdot R1+2 \cdot R2+1 \cdot R3)/16 \quad (1)$$

Here, as shown in FIG. 4, when a difference between the pixel value of the target pixel C and a pixel value of an adjacent pixel is greater than a threshold value $\epsilon$, (in the case of FIG. 4, the adjacent pixels R2 and R3), the pixel value of the target pixel C is substituted for that of the adjacent pixel in the calculation. That is, in the case of FIG. 4, the conversion result is given by:

$$C'=(1 \cdot L3+2 \cdot L2+3 \cdot L1+4 \cdot C++3 \cdot R1+2 \cdot C+1 \cdot C)/16 \quad (2)$$

Now returning to FIG. 1, the subtractor 2 subtracts the picture signal inputted from the $\epsilon$ filter 1 from the picture signal inputted from the previous stage (it is the same as the input to the $\epsilon$ filter 1) to extract the picture signal of which level slightly varies at areas other than the edge. The extracted picture signal is supplied to the amplifier 3 that amplifies the output of the subtractor 2 and supplies its output to the adder 4. The adder 4 adds the picture signal, of which signal level at areas other than the edge is amplified by the amplifier 3, to the picture signal in which only the edge is extracted from the $\epsilon$ filter 1. The additional result represents a picture signal of which pixel values at areas other than the edge is enhanced with that the abrupt edge in the picture signal is kept.

Here, in the case that the $\epsilon$ filter 1 smoothes the picture signal at the area other than the edge with the steep abrupt edge being kept, in order to provide a sufficient smoothing effect, if the number of taps is about seven, it is insufficient and thus a larger number of taps are required. Thus, there is a problem that the amount of calculation becomes larger.

In the $\epsilon$ filter 1 included in the picture signal processing apparatus shown in FIG. 1, it is assumed that the predetermined threshold value $\epsilon$ is 100. When the picture signal includes a steep slope edge of which height is more than 100 as shown in FIG. 5, the output signal from the $\epsilon$ filter 1 has a waveform in which the abrupt edge is held as shown in FIG. 6. However, if the height of the edge is slightly smaller than the threshold value $\epsilon$ (for example, the height of the edge is 99), the $\epsilon$ filter 1 outputs the picture signal in which the abrupt edge is not held as shown in FIG. 7. Here, in FIGS. 5 to 7, axes of abscissa represent the positions of pixels, and axes of ordinate represent pixel values.

Further, if the picture signal having a waveform shown in FIG. 8 is inputted, if the heights of the edges are more than 100, the $\epsilon$ filter 1 outputs an waveform in which the slopes of the edges are held as shown in FIG. 9. However, if the heights of the edges are slightly smaller than the threshold value $\epsilon$ (for example, the heights of the edges are 99), the $\epsilon$ filter 1 outputs an waveform in which the slopes of the edges cannot be held as shown in FIG. 10.

In other words, in the ε filter 1, there is also a problem that, when the height of the edge represented in the picture signal slightly varies around the threshold value ε, the waveform of the edges varies considerably, so that the reproduced image is deteriorated.

A preferred embodiment of the present invention provides a signal processing apparatus including a plurality of smoothing units for stepwise smoothing successively arranged signals, each smoothing units including: specification unit for successively specifying one of successively arranged signals as a target signal; determination unit for determining a plurality of adjacent signals, out of the successively arranged signals, at every predetermined interval based on the target signal specified by the specification unit; calculator for weight-averaging the target signal and a plurality of adjacent signals with a plurality of sets of different coefficients to calculate a plurality of smoothed signals; flag setting unit for calculating differences in level between the target signal and each of adjacent signals and signals arranged within the predetermined interval from the each of the adjacent signals toward the target signal and judging whether the differences are greater than a threshold value, wherein, when at least one of the calculated difference is greater than the threshold value, the flag setting unit sets flags to the adjacent signal, to an adjacent signal arranged at a symmetrical position of the judged adjacent signal with respect to the target signal, and to adjacent signals arranged beyond, viewed from the position of the target pixel, the adjacent signals to which flags are set; controller for controlling the calculator to use the target signal instead of the adjacent signals with the flags to calculate the smoothed signals; and selector for selecting one of a plurality of smoothed signals calculated by the calculator in accordance with the result of the flag setting unit.

The signals may be pixel values of pixels forming an image.

Each determination unit in a plurality of smoothing units may have different predetermined interval from those in other smoothing units.

Another preferred embodiment of the present invention provides a signal processing method including a plurality of steps of stepwise smoothing successively arranged signals, each smoothing step including: a specifying step of successively specifying one of successively arranged signals as a target signal; a determining step of determining a plurality of adjacent signals out of the successively arranged signals at every predetermined interval based on the target signal specified by the specifying step; a calculation step of weight-averaging the target signal and a plurality of adjacent signals with a plurality of sets of different coefficients to calculate a plurality of smoothed signals; a flag setting step calculating differences in level between the target signal and each of adjacent signals and signals arranged within the predetermined interval from the each of the adjacent signals toward the target signal and judging whether the differences are greater than a threshold value, wherein, when at least one of the calculated difference is greater than the threshold value, the flag setting step sets flags to the adjacent signal, to an adjacent signal arranged at a symmetrical position of the adjacent signal with respect to the target signal, and to adjacent signals arranged beyond, viewed from the position of the target pixel, the adjacent signals to which flags are set; a control step controlling the calculation step to use the target signal instead of the adjacent signals with the flags to calculate the smoothed signals; and a selection step of selecting one of a plurality of the smoothed signals calculated by the calculation step in accordance with the result of the flag setting step.

A still another preferred embodiment of the present invention provides a program on a recording medium including a plurality of steps of stepwise smoothing successively arranged signals, each smoothing step including: a specifying step of successively specifying one of successively arranged signals as a target signal; a determining step of determining a plurality of adjacent signals out of the successively arranged signals at every predetermined interval based on the target signal specified by the specifying step; a calculation step of weight-averaging the target signal and a plurality of sets of adjacent signals with a plurality of different coefficients to calculate a plurality of smoothed signals; a flag setting step calculating differences in level between the target signal and each of adjacent signals and signals arranged within the predetermined interval from the each of the adjacent signals toward the target signal and judging whether the differences are greater than a threshold value, wherein, when at least one of the calculated difference is greater than the threshold value, the flag setting step sets flags to the adjacent signal, to an adjacent signal arranged at a symmetrical position of the adjacent signal with respect to the target signal, and to adjacent signals arranged beyond, viewed from the position of the target pixel, the adjacent signals to which flags are set; a control step controlling the calculation step to use the target signal instead of the adjacent signals with the flags to calculate the smoothed signals; and a selection step of selecting one of a plurality of the smoothed signals calculated by the calculation step in accordance with the result of the flag setting step.

Another preferred embodiment of the present invention provides a signal processing apparatus including: specification unit for successively specifying one of successively arranged signals as a target signal; determination unit for determining a plurality of adjacent signals out of the successively arranged signals at every predetermined interval based on the target signal specified by the specification unit; operation unit for weight-averaging the target signal and a plurality of adjacent signals with a plurality of sets of different coefficients to operate a plurality of smoothed signals; calculator for calculating differences in level between the target signal and each of adjacent signals, comparing the calculated differences with a plurality of different threshold values, and calculating weighting coefficients on the basis of the comparison result, and synthesizer for synthesizing a plurality of smoothed signals operated by the operation unit in accordance with the weighting coefficients calculated by the calculator.

The signals may be pixel values of pixels forming an image.

A plurality of signal processing systems may be included in the signal processing apparatus and arranged in series, each including the specification unit, the determination unit, the operation unit, the calculator, and the synthesizer.

In the determination unit respectively included in a plurality of the signal processing systems, predetermined intervals may be different from each other.

Another preferred embodiment of the present invention provides a signal processing method including: a specifying step of successively specifying one of successively arranged signals as a target signal; a determining step of determining a plurality of adjacent signals out of the successively arranged signals at every predetermined interval based on the target signal specified by the specifying step; an operation step of weight-averaging the target signal and a plurality of adjacent signals with a plurality of sets of different coefficients to operate a plurality of smoothed signals; a calculation step of calculating differences in level between the target signal and each of adjacent signals, comparing the calculated differences with a plurality of different threshold values, and calculating weighting coefficients on the basis of the comparison result, and a synthesizing step for synthesizing a plurality of smoothed signals operated in the operation step in accordance with the weighting coefficients calculated in the calculation step.

A still another preferred embodiment of the present invention provides a program in computer-readable form to cause a computer to execute a plurality of smoothing steps of stepwise smoothing successively arranged signals, each smoothing step including: a specifying step of successively specifying one of successively arranged signals as a target signal; a determining step of determining a plurality of adjacent signals out of the successively arranged signals at every predetermined interval based on the target signal specified by the specifying step; a calculation step of weight-averaging the target signal and a plurality of adjacent signals with a plurality of sets of different coefficients to calculate a plurality of smoothed signals; a flag setting step calculating differences in level between the target signal and each of adjacent signals and signals arranged within the predetermined interval from the each of the adjacent signals toward the target signal and judging whether the differences are greater than a threshold value, wherein, when at least one of the calculated differences is greater than the threshold value, the flag setting step sets flags to the adjacent signal, to an adjacent signal arranged at a symmetrical position of the adjacent signal with respect to the target signal, and to adjacent signals arranged beyond, viewed from the position of the target pixel, the adjacent signals to which flags are set; a control step controlling the calculation step to use the target signal instead of the adjacent signals with the flags to calculate the smoothed signals; and a selection step of selecting one of a plurality of the smoothed signals calculated by the calculation step in accordance with the result of the flag setting step.

Another preferred embodiment of the present invention provides the signal processing apparatus, the method of processing signals, and the programs, for smoothing successively arranged signals stepwise, wherein, in each of the smoothing processes, one of successively arranged signals is successively specified as a target signal, a plurality of adjacent signals out of the successively arranged signals are determined at every predetermined interval based on the target signal specified. Differences in level are calculated between the target signal and each of adjacent signals and signals arranged within the predetermined interval from the each of the adjacent signals toward the target signal, and it is judged whether the differences are greater than a threshold value. When at least one of the calculated differences is greater than the threshold value, flags are set to the adjacent signal, to an adjacent signal arranged at a symmetrical position of the adjacent signal with respect to the target signal, and to adjacent signals arranged beyond, viewed from the position of the target pixel, the adjacent signals to which flags are set. The target signal and a plurality of adjacent signals are weighted-averaged with a plurality of sets of different coefficient with that the target signal is used instead of the adjacent signals with the flags to calculate the smoothed signals. Further, one of a plurality of the smoothed signals is selected in accordance with the result of the flag setting result.

A further preferred embodiment of the present invention provides a program included in a recording medium having: a specifying step of successively specifying one of successively arranged signals as a target signal; a determining step of determining a plurality of adjacent signals out of the successively arranged signals at every predetermined interval based on the target signal specified by the specifying step; an operation step of weight-averaging the target signal and a plurality of adjacent signals with a plurality of sets of different coefficients to operate a plurality of smoothed signals; a calculation step of calculating differences in level between the target signal and each of adjacent signals, comparing the calculated differences with a plurality of different threshold values, and calculating weighting coefficients on the basis of the comparison result, and a synthesizing step for synthesizing a plurality of smoothed signals operated by the operation step in accordance with the weighting coefficients calculated by the calculation step.

Another preferred embodiment of the present invention provides a program in computer-readable form for causing a computer to execute: a specifying step of successively specifying one of successively arranged signals as a target signal; a determining step of determining a plurality of adjacent signals out of the successively arranged signals at every predetermined interval based on the target signal specified by the specifying step; an operation step of weight-averaging the target signal and a plurality of adjacent signals with a plurality of sets of different coefficients to operate a plurality of smoothed signals; a calculation step of calculating differences in level between the target signal and each of adjacent signals, comparing the calculated differences with a plurality of different threshold values, and calculating weighting coefficients on the basis of the comparison result, and a synthesizing step for synthesizing a plurality of smoothed signals operated by the operation step in accordance with the weighting coefficients calculated by the calculation step.

According to another preferred embodiment of the present invention, in the signal processing apparatus, the method of processing signals, and the programs, one of successively arranged signals is successively specified as a target signal. Out of the successively arranged signals, a plurality of adjacent signals arranged at every predetermined interval is successively determined based on the target signal as a center. The target signal and a plurality of adjacent signals are weight-averaging with a plurality of sets of different coefficients to operate a plurality of smoothed signals. Differences in level are calculated between the target signal and each of adjacent signals. The calculated differences are compared with a plurality of different threshold values. Weighting coefficients are calculated on the basis of the comparison result. Then, a plurality of smoothed signals are synthesized in accordance with the weighting coefficients.

According to the preferred embodiments of the present invention, a filtering process is provided, in which picture signals are smoothed at portions other than the edges having a picture signal having edge width within a tap interval where changes in pixel values are abrupt, and still accurately keeping such edges.

A preferred embodiment of the present invention provides the filtering process smoothing a picture signal at portions other than edges with that the slopes of edges in waveforms are kept. Thus, though the height of the edge in pixel value varies slightly, the configuration of the edge in the converted picture signal varies gradually at the edge.

BRIEF DESCRIPTION OF THE DRAWINGS

The object and features of the present invention will become more readily apparent from the following detailed description taken in conjunction with the accompanying drawings in which:

FIG. 1 is a block diagram of a picture signal processing apparatus for enhancing images at portions other than an edge according to related art;

FIG. 14 is an illustration illustrating taps, the interval between which is four pixel pitches, according to the present invention;

FIG. 15 is an illustration illustrating taps, the interval between which is two pixel pitches, according to the present invention;

FIG. 16 is an illustration illustrating taps, the interval between which is one pixel pitch, according to the present invention;

FIG. 17 is a table illustrating taps used in smoothing according to the first embodiment of the present invention;

FIG. 19 is an illustration showing a waveform of a picture signal outputted from the nonlinear filter shown in FIG. 13B when a picture signal shown in FIG. 5 is inputted, according to the first embodiment of the present invention;

FIG. 20 is a block diagram of a nonlinear filter according to a second embodiment of the present invention;

FIG. 21 is an illustration showing taps set in the nonlinear filter shown in FIG. 20 according to the second embodiment;

FIG. 22 is a table illustrating taps used in smoothing according to the second embodiment of the present invention;

FIG. 30 is an illustration showing taps set in the narrow band processing section in FIG. 29, the interval between which is four pixel pitches according to the third embodiment of the present invention;

FIG. 31 is an illustration showing taps set in the middle band processing section in FIG. 29, the interval between which is two pixel pitches, according to the third embodiment of the present invention;

FIG. 32 is an illustration showing taps set in the broad band processing section in FIG. 29, the interval between which is one pixel pitch, according to the third embodiment of the present invention;

FIG. 33 is a table illustrating taps used in smoothing according to the third embodiment of the present invention;

DESCRIPTION OF THE PREFERRED
EMBODIMENTS OF THE INVENTION

Preferred embodiments of the present invention will be describing below, with reference to the appended drawings.

First, a processing method of a picture signal representing an edge will be further described.

In the ε filter 1 shown in FIG. 1, there were problems in which, if a larger number of pixels are used for tap, there is a problem that the amount of calculation becomes larger, and there is also a problem that, when the height of the edge represented in the picture signal slightly varies around the threshold value ε, the waveform of the edges varies considerably.

Then, in view of such problem, the inventors of the present invention developed a method of processing a picture signal in which an amount of calculation is reduced by setting a plurality of sets of taps for adjacent pixels and using them stepwise, interval between which is varied stepwise also. The inventors filed to the Patent Office of Japan a Japanese patent application No. 2002-333488 directed to such method.

Figure 11:
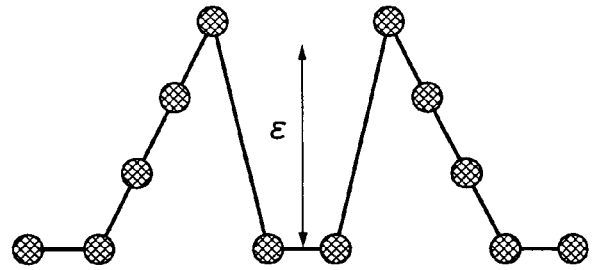
FIG. 11 is an illustration showing an example waveform of a picture signal before filtering process.
Figure 12:
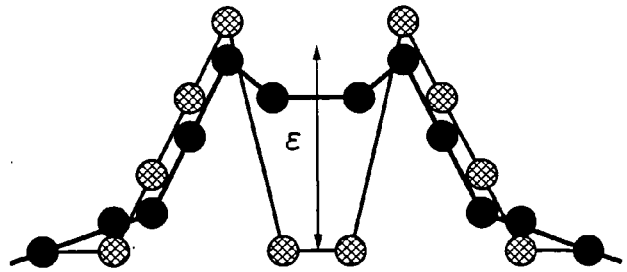
FIG. 12 is an illustration showing an example waveform of a picture signal after filtering process with the ε filter disclosed in Japanese patent application No. 2002-333488 when the waveform shown in FIG. 5 is inputted.

However, in this method, if the interval of taps is four pixel pitches, with that a width of a gap between edges is within the interval as shown in FIG. 11 is inputted to the ε filter, a waveform of the picture signal becomes as shown in FIG. 12, so that the waveform of the edge in the picture signal is inaccurately held.

In consideration of this situation, the present invention has been conceived to provide signal processing for smoothing areas other than edges with that the slopes of the edges in the picture signal are held though the width of the edges is within the interval of taps.

First Embodiment

Figure 13A:
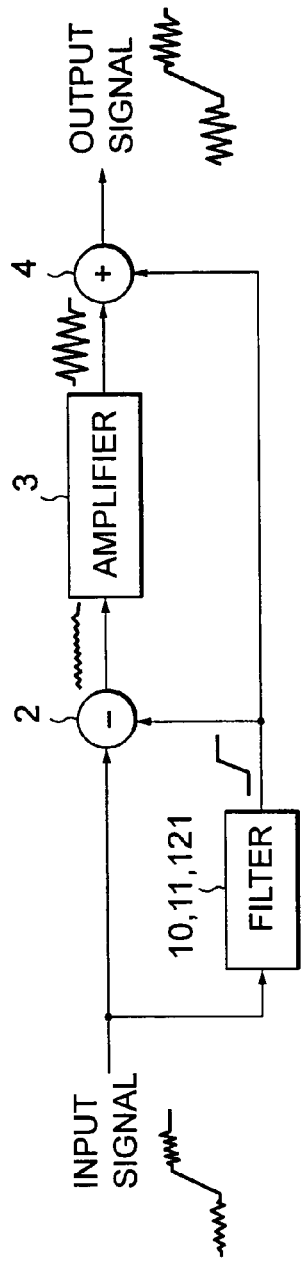
FIG. 13A is a block diagram of a picture signal processing apparatus for enhancing images at portions other than an edge with that the steep abrupt edge is kept according to the present invention.
Figure 13B:
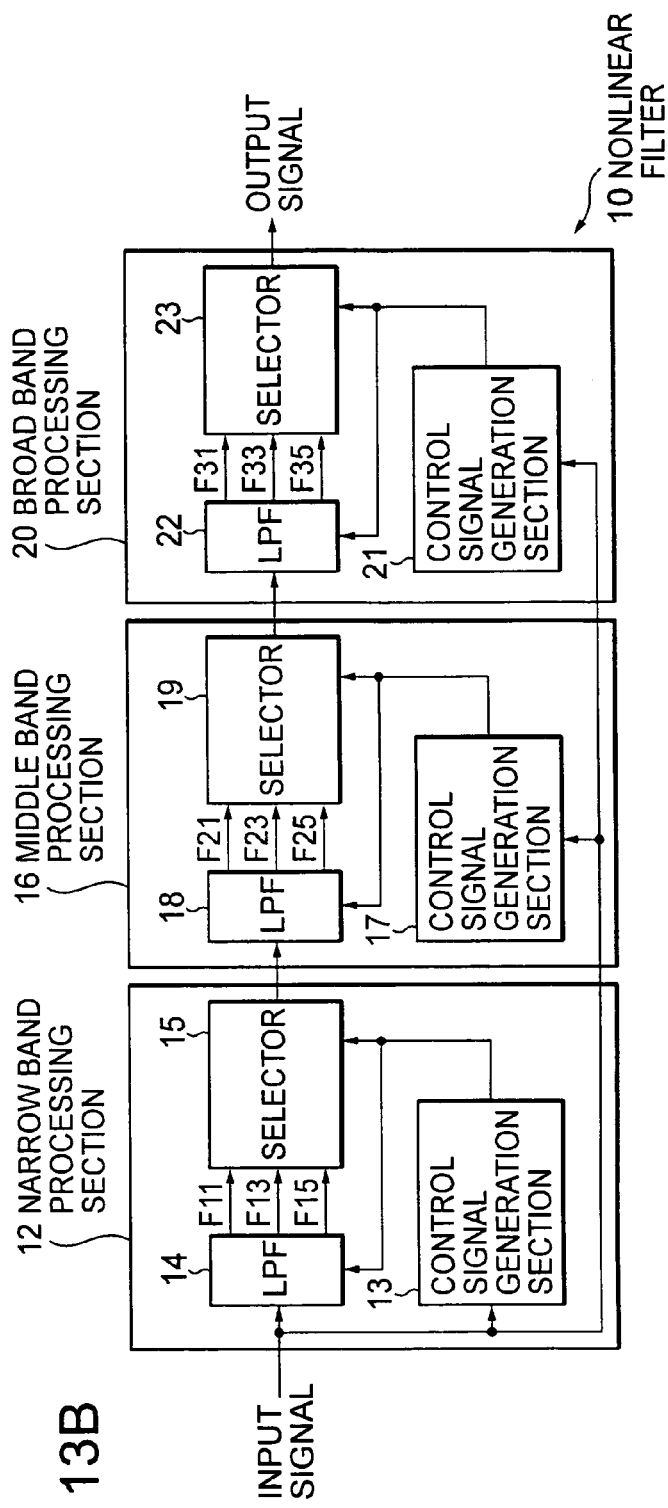
FIG. 13B is a block diagram of a nonlinear filter used in the picture signal processing apparatus shown in FIG. 13A according to a first embodiment of the present invention.

FIG. 13A shows a block diagram of a picture signal processing apparatus including a nonlinear filter 10 according to the present invention. FIG. 13B is a block diagram of the nonlinear filter 10 according to a first embodiment of the present invention.

In the picture signal processing apparatus shown in FIG. 13A, the inputted picture signal is supplied to a nonlinear filter 10, and a subtractor 2. When the nonlinear filter 10 is supplied with the picture signal representing an edge and pixel level slightly varying at portions before and after the edge, the nonlinear filter 10 converts it into a converted picture signal in which only an edge is extracted and supplies the converted picture signal to the subtractor 2 and an adder 4. The subtractor 2 subtracts the picture signal inputted from the nonlinear filter 10 from the picture signal inputted from the previous stage to extract the picture signal slightly varying at areas other than the edge. The extracted picture signal is supplied to the amplifier 3 that amplifies the output of the subtractor 2 and supplies its output to the adder 4. The adder 4 adds the picture signal from the amplifier 3, its signal level at areas other than the edge being amplified by the amplifier 3, to the picture signal from the nonlinear filter 10, in which only the edge is extracted from the $\epsilon$ filter 1. The additional result represents a picture signal of which pixel values at areas other than the edge is enhanced with that the abrupt edge in the picture signal is kept.

Structure of Nonlinear Filter 10

The nonlinear filter 10 includes a narrow band processing section 12 for filtering the input picture signal with taps for five pixels, the interval between which is four pixel intervals, a middle band processing section 16 for filtering the output of the narrow band processing section 12 with taps for five pixels, the interval between which is two pixel pitches, and a broad band processing section 20 for filtering the output of the middle band processing section 16 with taps for five pixels, the interval between which is one pixel interval.

The taps having interval of four pixel pitches is shown in FIG. 14. Among pixels arranged in an horizontal direction, eighth pixel l8, and fourth pixel l4 at the left of the target pixel C, and fourth pixel r4 and eighth pixel r8 at the right of the target pixels C are adjacent pixels at the interval of four pixel pitches, respectively. The taps are provided to output pixel values for operation.

The taps having interval of two pixel pitches is shown in FIG. 15. Among pixels arranged in the horizontal direction, the fourth pixel l4 and the second pixel l2 at the left of the target pixel C, and the second pixel r2 and the fourth pixel r4 at the right of the target pixels C are adjacent pixels at the interval of two pixel pitches, respectively. The taps are provided to output pixel values for operation.

The taps having interval of one pixel pitch is shown in FIG. 16. Among pixels arranged in the horizontal direction, the second pixel l2 and the first pixel l1 at the left of the target pixel C, and the first pixel r1 and the second pixel r2 at the right of the target pixels C are adjacent pixels at the interval of one pixel pitch, respectively. The taps are provided to output pixel values for operation.

Now returning to FIG. 13B, the narrow band processing section 12 includes a control signal generation section 13 generating control signals on the basis of the picture signal inputted from the previous stage, a low pass filter 14 setting taps for five pixels, the interval of the taps being four, and weight-averaging pixel values at taps with three types of tap coefficients and outputting smoothed signals F11, F13, and F15, and a selector 15 for selecting one of smoothed signals F11, F13, and F15 in accordance with the control signal generated by the control signal generation section 13 to supply the selected signal to the rear stage of middle band processing section 16.

The middle band processing section 16 includes a control signal generation section 17 generating control signals on the basis of the picture signal inputted from the previous stage (narrow band processing section 12), a low pass filter 18 setting taps for five pixels, the interval of the taps being two pixel pitches, and weight-averaging pixel values at taps with three types of tap coefficients and outputting smoothed signals F21, F23, and F25, and a selector 19 for selecting one of smoothed signals F21, F23, and F25 in accordance with the control signal generated by the control signal generation section 17 to supply the selected signal to the rear stage of broad band processing section 20.

The broad band processing section 20 includes a control signal generation section 21 generating control signals on the basis of the picture signal inputted from the previous stage (middle band processing section 16), a low pass filter 22 for setting taps for five pixels, the interval of the taps being one pixel pitch, and weight-averaging pixel values at taps with three types of tap coefficients and outputting smoothed signals F31, F33, and F35, and a selector 23 for selecting one of smoothed signals F31, F33, and F35 in accordance with the control signal generated by the control signal generation section 21 to supply the selected signal to the rear stage of nonlinear filter 10.

FIG. 17 is a table illustrating an example of sets of different tap coefficients used in the low pass filters 14, 18, and 22 according to the present embodiment.

In the low pass filter 14, taps with interval of four pixel pitches are provided and the smoothed signal F11 is operated in which tap coefficients {0, 0, 1, 0, 0} are used as follows:

$$F11=(0 \cdot L2+0 \cdot L1+1 \cdot C+0 \cdot R1+0 \cdot R2)/1 \qquad (3)$$

This operation corresponds to weight-averaging in the $\epsilon$ filter 1 shown in FIG. 1 in which taps are provided for seventeen pixels and coefficients {0, 0, 0, 0, 0, 0, 0, 0, 1, 0, 0, 0, 0, 0, 0, 0, 0} are used.

In the low pass filter 14, taps with interval of four pixel pitches are provided and the smoothed signal F13 is operated in which tap coefficients {0, 1, 2, 1, 0} are used as follows:

$$F13=(0 \cdot L2+1 \cdot L1+2 \cdot C+1 \cdot R1+0 \cdot R2)/4 \qquad (4)$$

This operation corresponds to weight-averaging in the $\epsilon$ filter 1 shown in FIG. 1 in which taps are provided for seventeen pixels and coefficients {0, 0, 0, 0, 1, 0, 0, 0, 2, 0, 0, 0, 1, 0, 0, 0, 0} are used.

In the low pass filter 14, taps with interval of four pixel pitches are provided and the smoothed signal F15 is operated in which tap coefficients {1, 2, 2, 2, 1} are used as follows:

$$F15=(1 \cdot L2+2 \cdot L1+2 \cdot C+2 \cdot R1+1 \cdot R2)/8 \qquad (5)$$

This operation corresponds to weight-averaging in the $\epsilon$ filter 1 shown in FIG. 1 in which taps are provided for seventeen pixels and coefficients {1, 0, 0, 0, 2, 0, 0, 0, 2, 0, 0, 0, 2, 0, 0, 0, 1} are used.

Similarly, in the low pass filter 18, taps with interval of two pixel pitches are provided and the smoothed signal F21 is operated in which tap coefficients {0, 0, 1, 0, 0} are used as shown in Eq. (3). This operation corresponds to weight-averaging in the $\epsilon$ filter 1 shown in FIG. 1 in which taps are provided for nine pixels and tap coefficients {0, 0, 0, 0, 1, 0, 0, 0, 0} are used.

In the low pass filter 18, taps with interval of two pixel pitches are provided and the smoothed signal F23 is operated in which tap coefficients {0, 1, 2, 1, 0} are used as shown in Eq. (4). This operation corresponds to weight-averaging in the $\epsilon$ filter 1 shown in FIG. 1 in which taps are provided for nine pixels and tap coefficients {0, 0, 1, 0, 2, 0, 1, 0, 0} are used.

In the low pass filter 18, taps with interval of two pixel pitches are provided and the smoothed signal F25 is operated in which tap coefficients {1, 2, 2, 2, 1} are used as shown in Eq. (5).

This operation corresponds to weight-averaging in the $\epsilon$ filter 1 shown in FIG. 1 in which taps are provided for nine pixels and tap coefficients {1, 0, 2, 0, 2, 0, 2, 0, 1} are used.

Similarly, in the low pass filter 22, taps with interval of one pixel pitch are provided and the smoothed signal F31 is operated in which tap coefficients {0, 0, 1, 0, 0} are used as shown in Eq. (3).

In the low pass filter 22, taps with interval of one pixel pitch are provided and the smoothed signal F33 is operated in which tap coefficients {0, 1, 2, 1, 0} are used as shown in Eq. (4).

In the low pass filter 22, taps with interval of one pixel pitch are provided and the smoothed signal F35 is operated in which tap coefficients {1, 2, 2, 2, 1} are used as shown in Eq. (5).

Here, in the operation in the above-described Eqs. (3) to (5), the pixel value of the target pixel C are substituted for pixel values of adjacent pixels L2, L1, R1, and R2 in accordance with whether the difference between a pixel value of each adjacent pixels L2, L1, R1, and R2 and the pixel value of the target pixel C is greater than a predetermined threshold value $\epsilon$.

As mentioned above, the nonlinear filter 10 processes the input picture signal through three stages of filtering with the low pass filters 14, 18, and 22. For example, when the smoothed signal F15 is selected by the selector 15 in the narrow band processing section 12, the smoothed signal F25 is selected by the selector 15 in the middle band processing section 16, and the smoothed signal F35 is selected by the selector 23 in the broad band processing section 20, the smoothed signal as the output of the nonlinear filter 10 corresponds to the result of the weight-averaging that would be provided with tap coefficients and taps for twenty-seven pixels in the $\epsilon$ filter 1 shown in FIG. 1.

Operation of Nonlinear Filter 10

Figure 18:
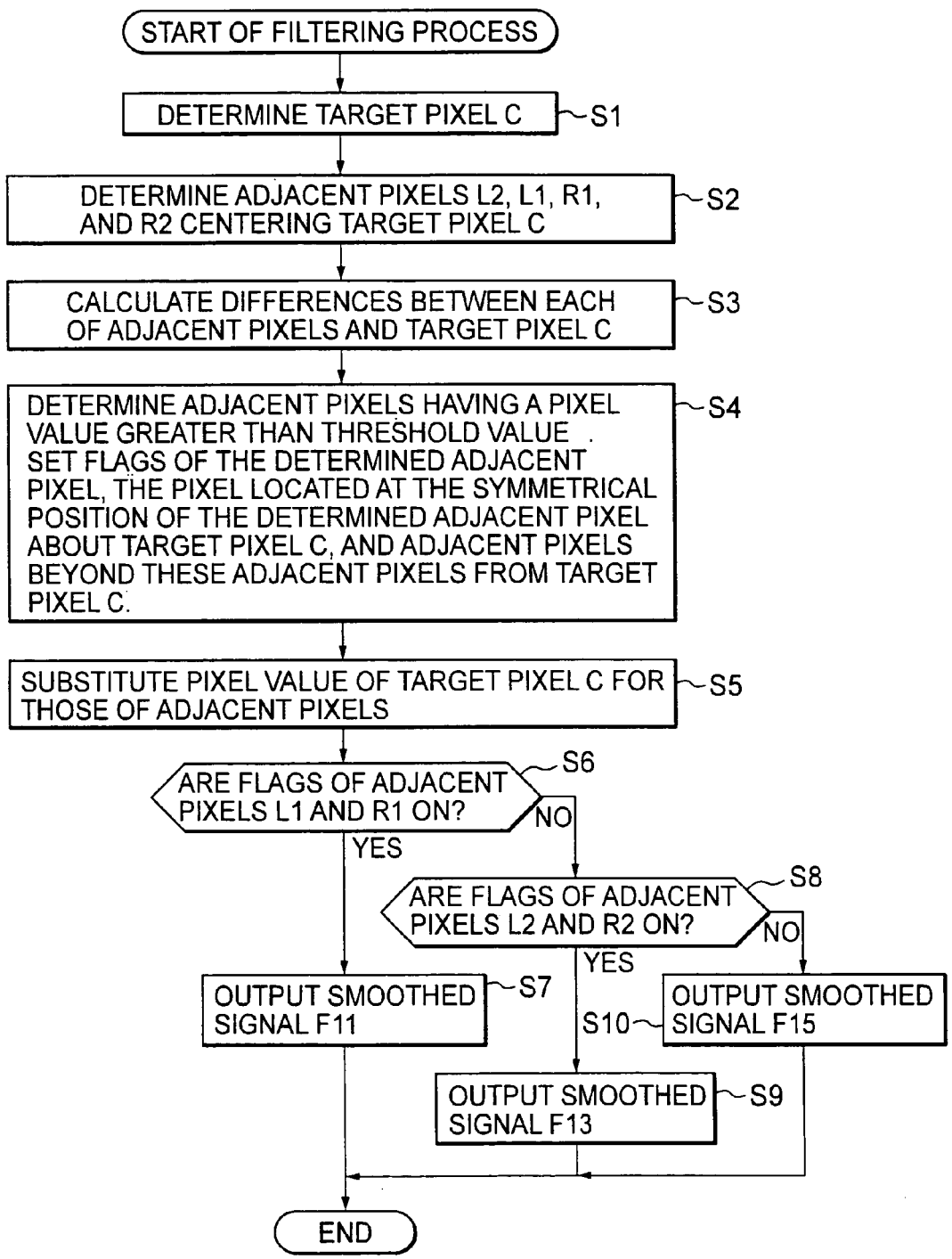
FIG. 18 depicts a flow chart illustrating operation of the filtering process in the narrow band processing section shown in FIG. 13B according to the present invention.

First, the filtering process in the narrow band processing section 12 will be described with reference to the flow chart in FIG. 18.

In step S1, the control signal generation section 13 successively determines every one pixel as a target pixel C from pixels forming the input picture signal coming in order in raster of input picture signal. In step S2, the control signal generation section 13 sets or determines taps with interval of four pixel pitches for adjacent pixels L2, L1, R1, and R2 as shown in FIG. 14. In step S3, the control signal generation section 13 calculates difference in pixel value between the centered target pixel C and each of pixels l1 to l8 at the left of the target pixel C and pixels r1 to r8 at the right of the target pixel C.

In step S4, the control signal generation section 13 judges (determines, decides) whether the differences calculated in step S3 are greater than a predetermined threshold value $\epsilon$ and sets a flag ON for adjacent pixel on the basis of the judgment result. Further, the flag of the adjacent pixel at the symmetrical position of the adjacent pixel to which the flag is set ON with respect to the target pixel C is set ON. In addition, flags of adjacent pixels beyond the adjacent pixels, of which flags have been set ON, at symmetric positions with respect to the target pixel, are also set ON.

For example, regarding the adjacent pixel L1, it is judged (determined, decided) whether differences in pixel value between each of pixels l1 to l4 and the target pixel are greater than the predetermined threshold value $\epsilon$. If any one of four differences |C−l1|, |C−l2|, |C−l3|, and |C−l4| is greater than the predetermined threshold value $\epsilon$, the flag of the adjacent pixel L1 is set ON. Further, the flag of the adjacent pixel R1 located at the symmetric position of the adjacent pixel L1 with respect to the target pixel C. Further, the flags are set ON for the adjacent pixels L2 and R2 located beyond the adjacent pixels L1 and R1 viewed from the target pixel C.

Regarding an adjacent pixel L2, it is judged whether differences in pixel value between each of pixels l5 to l8 and the target pixel are greater than the predetermined threshold value $\epsilon$. If any one of four differences |C−l5|, |C−l6|, |C−l7|, and |C−l8| is greater than the predetermined threshold value $\epsilon$, the flag of the adjacent pixel L2 is set ON. Further, the flag is set for the adjacent pixel R2 located at the symmetric position of the adjacent pixel L2 with respect to the target pixel C.

Regarding an adjacent pixel R1, it is judged whether differences in pixel value between each of pixels r1 to r4 and the target pixel are greater than the predetermined threshold value $\epsilon$. If any one of four differences |C−r1|, |C−r2|, |C−r3|, and |C−r4| is greater than the predetermined threshold value $\epsilon$, the flag of the adjacent pixel R1 is set ON. Further, the flag is set for the adjacent pixel L1 located at the symmetric position of the adjacent pixel R1 with respect to the target pixel C. Further, the flags are set ON for the adjacent pixels L2 and R2 located beyond the adjacent pixels L1 and R1 from the target pixel C.

Regarding the adjacent pixel R2, it is judged whether differences in pixel value between each of pixels r5 to r8 and the target pixel are greater than the predetermined threshold value $\epsilon$. If any one of four differences |C−r5|, |C−r6|, |C−r7|, and |C−r8| is greater than the predetermined threshold value $\epsilon$, the flag of the adjacent pixel R2 is set ON. Further, the flag is set for the adjacent pixel L2 located at the symmetric position of the adjacent pixel R1 with respect to the target pixel C.

Further, in step S4, the control signal generation section 13 supplies control signals indicative of ON/OFF of the flags of adjacent pixels L21, L1, R1, and R2 to the low pass filter 14 and the selector 15.

In step S5, the low pass filter 13 weighted-averages pixels values of the target pixel C and the adjacent pixels L2, L1, R1, and R2 using Eqs. (3) to (5) to calculate smoothed signals F11, F13, and F15 that are supplied to the selector 15. Here, the pixel value of the target pixel C is substituted for adjacent pixels of which flags are set ON for operation.

For example, if flags of the adjacent pixels L2 and R2 are set ON, the smoothed signals F11, F13, and F15 are operated as follows:

$$F11=(0·C+0·L1+1·C+0·R1+0·C)/1$$

$$F13=(0·C+1·L1+2C+1·R1+0·C)/4$$

$$F15=(1·C+2·L1+2·C+2·R1+1·C)/8$$

In step S6, the selector 15 judges whether flags of the adjacent pixels L1 and R1 are set ON in accordance with the control signal from the control signal generation section 13. If the flags of the adjacent pixels L1 and R2 are judged to be ON, processing proceeds to step S7. In step S7, the selector 15 supplies the smoothed signal F11 from the smoothed signals F11, F13, and F15 inputted from the low pass filter 14 to the rear stage of the middle band processing section 16.

In step S6, if the flags of the adjacent pixel L1 and R1 are judged to be OFF, processing proceeds to step S8. In step S8, the selector 15 judges whether the flag of the adjacent pixels L2 and R2 are set ON on the basis of the control signal from the control signal generation section 13. If the flags of the adjacent pixels L2 and R2 are judged to be ON, processing proceeds to step S9. In step S9, the selector 15 supplies the smoothed signal F13 from the smoothed signal F11, F13, and F15 inputted from the low pass filter 14 to the rear stage of the middle band processing section 16.

In step S8, if the flags of the adjacent pixel L2 and R2 are judged to be OFF, processing proceeds to step S10. In step S10, the selector 15 supplies the smoothed signal F15 from the smoothed signals F11, F13, and F15 inputted from the low pass filter 14 to the rear stage of the middle band processing section 16. This is the filtering process in the narrow band processing section 12.

In the above-description, the smoothed signals F11, F13, and F15 are operated in the low pass filter 14, and the selector 15 supplies one from smoothed signals F11, F13, and F15 in accordance with the control signal from the control signal generation section 13 to the rear stage. However, it is also possible that the low pass filter 14 operates one out of the smoothed signals F11, F13, and F15 in accordance with the control signal from the control signal generation section 13 in order to omit the selector 15.

The output of the narrow band processing section 12 is further filtered by the middle band processing section 16 wherein its filtering process is the same as that of the above-described narrow band processing section 12 except that an interval of two pixel pitches is set for taps. Thus, its description will be omitted.

The output of the middle band processing section 16 is further filtered by the broad band processing section 20, wherein its filtering process is the same as that of the above-described narrow band processing section 12 except that an interval of one pixel pitch is set for taps. Thus, its description will be omitted.

As mentioned above, the nonlinear filter 10 accurately holds the abrupt edges as shown in FIG. 19 even if a width of a gap between edges in the picture signal is within the interval of taps as shown in FIG. 11.

In addition, the present invention is widely applicable to apparatuses dealing with picture signals, such as video cameras, digital still cameras, printers, displays, and computers and the like.

For example, if the present invention is applied to a computer executing image processing, upon adjusting a contrast of an image, it can provide a high quality contrast-adjusted image with the dynamic range being held. In addition, when images obtained under different illumination condition are synthesized, it is possible to compensate the difference in contrast components between these images to produce a natural synthesized image.

Second Embodiment

FIG. 20 is a block diagram of a nonlinear filter of a second embodiment of the present invention. This nonlinear filter 11 is used in the picture signal processing apparatus shown in FIG. 13A. In this nonlinear filter 11, if a height of an edge in the input picture signal varies slightly around the predetermined threshold value, the abrupt edges in the converted picture signal varies slightly. More specifically, if the height (pixel value) of the edge is lower than a predetermined threshold value $\epsilon 1$, change in pixel value through conversion is made gradually until the pixel value becomes lower than a threshold value $\epsilon 2$ ($\epsilon 2 < \epsilon 1$).

Structure of Nonlinear Filter 11

The nonlinear filter 11 includes a control signal generation section 113, a low pass filter 114, and a synthesizing section 115. The control signal generation section 113 generates weighting coefficients w1 and w3 on the basis of the picture signal inputted from the previous stage and supplies them as a control signal to the synthesizing section 115. The low pass filter 114 sets taps, with an interval of one pixel pitch, for adjacent pixels at the left and the right of the target pixels C, for example, as shown in FIG. 21 and weighted-averages pixel values of five pixels within the taps with three types of tap coefficients to calculate three types of smoothed signals F1, F3, and F5. The synthesizing section 115 synthesizes the smoothed signals F1, F3, and F5 in accordance with the control signal generated by the control signal generation section 113.

FIG. 22 illustrates an example of tap coefficients used in the low pass filter 114. In the low pass filter 114, five pixels within taps L2, L2, C, R1, R2 are successively set, and the smoothed signal F1 is calculated with tap coefficients {0, 0, 1, 0, 0} by:

$$F1=(0·L2+0·L1+1·C+0·R1+0·R2)/1 \qquad (6)$$

The low pass filter 114 also operates a smoothed signal F3 with tap coefficients {0, −1, 2, 1, 0} by:

$$F3=(0·L2+1·L1+2·C+1·R1+0·R2)/4 \qquad (7)$$

The low pass filter 114 also operates a smoothed signal F5 with tap coefficients {1, 2, 2, 2, 1} by:

$$F5=(1·L2+2·L1+2C+2·R1+1·R2)/8 \qquad (8)$$

Operation of Nonlinear Filter 11

Figure 23:
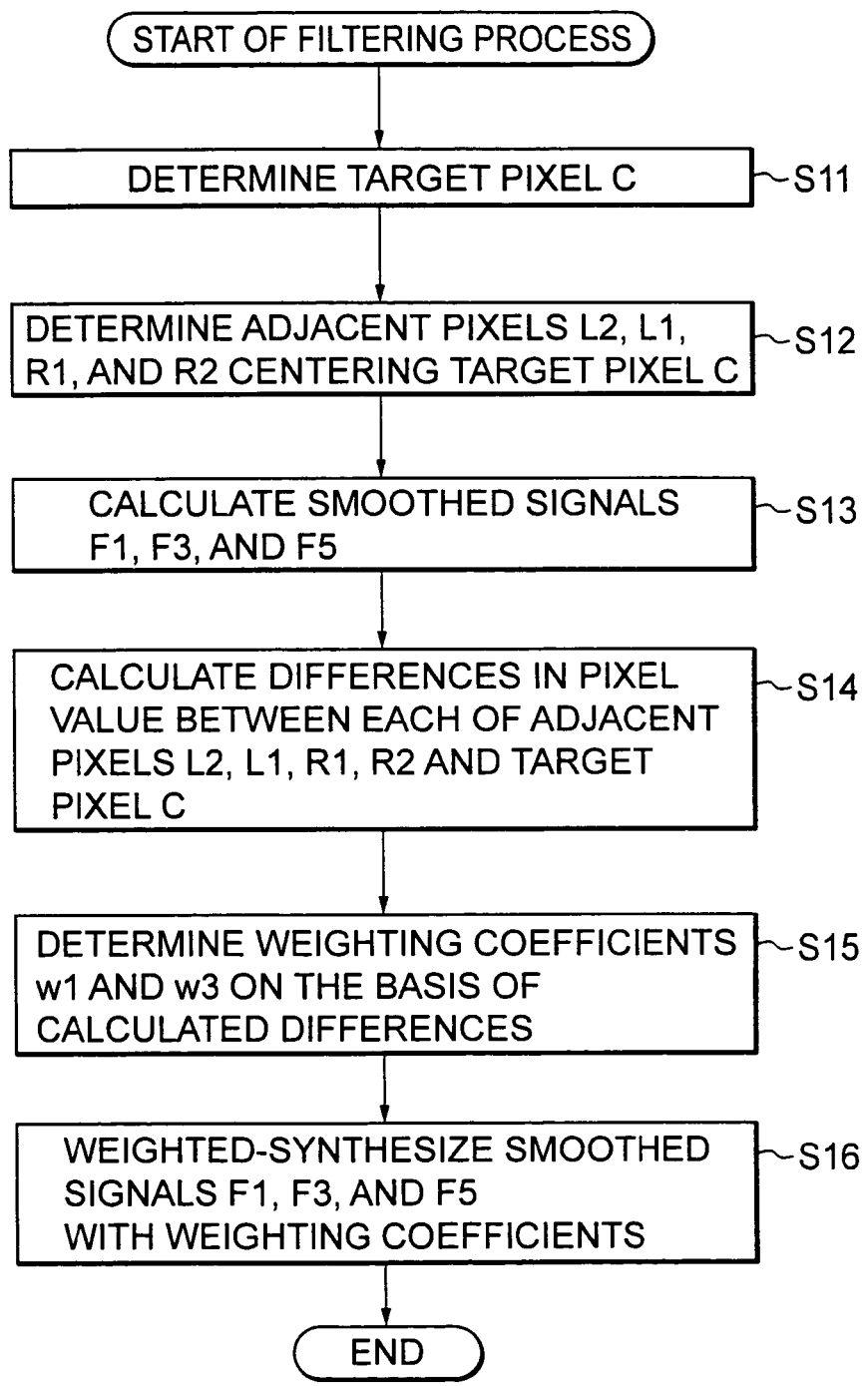
FIG. 23 depicts a flow chart illustrating operation of the filtering process in the nonlinear filter shown in FIG. 20 according to the second embodiment of the present invention.

Next, the filtering process in the nonlinear filter 11 will be described with the flow chart in FIG. 23.

In step S11, the control signal generation section 113 successively determines, as a target pixel C, one of pixels forming the input picture signal coming in order in a raster. In step S12, the control signal generation section 13 sets taps for adjacent pixels L2, L1, R1, and R2 adjacent to, and at the left and the right of, the target pixel C, as shown in FIG. 21, wherein the target pixel is centered. Hereinafter, the pixels L2, L1, R1, and R2 are referred to as adjacent pixels L2, L1, R1, and R2.

In step S13, the low pass filter 114 weighted-averages the target pixel C and adjacent pixels L2, L1, R1, and R2 with Eqs. (6), (7), and (8) to supply the resultant smoothed signal F1, F3, and F5 to the synthesizing section 115.

In step S14, the control signal generation section 12 operates difference in pixel value |L2−C|, |L1−C|, |R1−C|, and |R2−C| between each of the adjacent pixels L2, L1, R1, and R2 and the target pixel C.

In step S15, the control signal generation section 113 calculates weighting coefficients w1 and w3 used in the synthesizing section 115 on the basis of the differences calculated in step S14. More specifically, out of differences |L1−C| and |R1−C| of the adjacent pixels L1 and R1 at symmetric positions with respect to the target pixel C, the larger one is substituted for variable d1 as follows:

$$d1=MAX[|L1-C|,|R1-C|]$$

Figure 24:
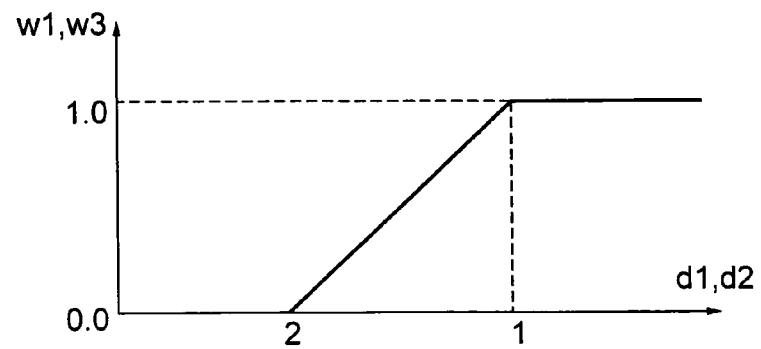
FIG. 24 is a graphical drawing illustrating the weighting operation in the nonlinear filter shown in FIG. 20 according to the second embodiment and also used in description for a third embodiment.

Then, the weighting coefficient w1 is calculated in accordance with the variable d1 as shown in FIG. 24.

When $d1<\epsilon 2$, $w1=0$
When $\epsilon 2 \leq d1 < \epsilon 1$, $w1=(d1-\epsilon 2)/((1-\epsilon 2)$
When $\epsilon 1 \leq d1$, $w1=1$ Similarly, out of differences |L2−C| and |R2−C| of the adjacent pixels L2 and R2 at symmetric positions with respect to the target pixel C, the larger one is substituted for variable d2 as follows:

$$d2=MAX[|L2-C|,|R2-C|]$$

Then, the weighting coefficient w3 is calculated in accordance with the variable d2 as shown in FIG. 24.

When $d2<\epsilon 2$, $w3=0$
When $\epsilon 2 \leq d2 < \epsilon 1$, $w3=(d2-2)/(\epsilon 1-\epsilon 2)$
When $\epsilon 1 \leq d2$, $w3=1$ As mentioned above, the calculated weighting coefficients w1 and w3 are supplied to the synthesizing section 115 as the control signal. In step S16, the synthesizing section 115 synthesizes the smoothed signals F1, F3, and F5 operated by the low pass filter 114 in accordance with Eq. (9) with the weighting coefficients w1 and w3 calculated by the control signal generation section 113 to supply a pixel value C' after filtering for the target pixel C.

$$C'=w1 \cdot F1+(1-w1)\cdot w3 \cdot F3+(1-w1)\cdot (1-w3)\cdot F5 \quad (9)$$

Figure 2A:
FIG. 2A is a graphical drawing illustrating a waveform of a picture signal inputted into the ε filter shown in FIG. 1.
Figure 2B:
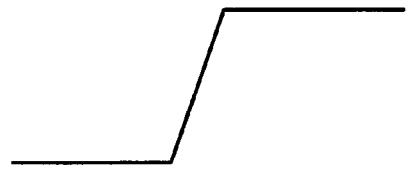
FIG. 2B is a graphical drawing illustrating a waveform of an output picture signal from the picture signal processing apparatus shown in FIG. 1.
Figure 3:
FIG. 3 is a graphical drawing illustrating an example of taps used in the ε filter shown in FIG. 1.
Figure 4:
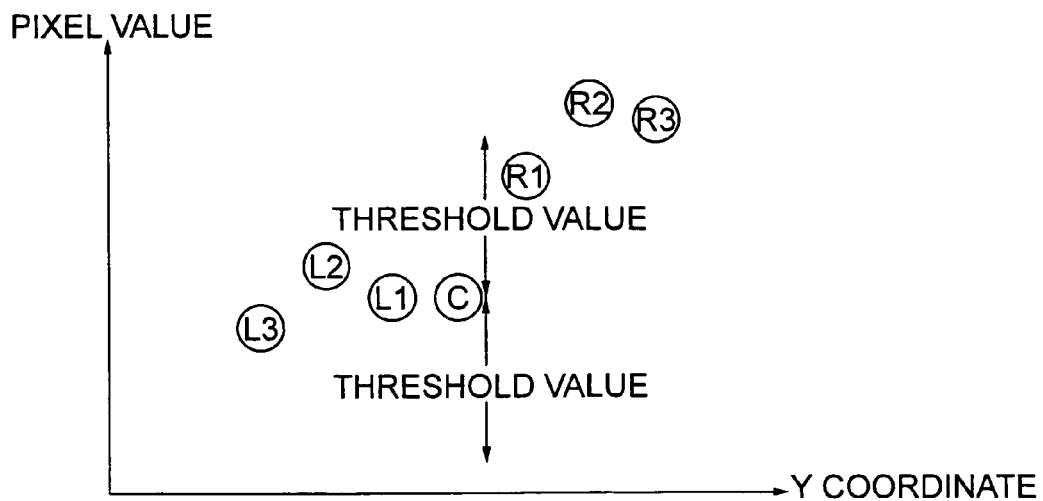
FIG. 4 is a graphical drawing illustrating operation in the ε filter shown in FIG. 1.
Figure 5:
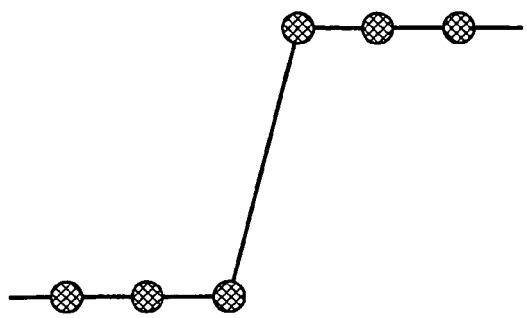
FIG. 5 is an illustration showing a waveform of a picture signal before filtering process.
Figure 6:
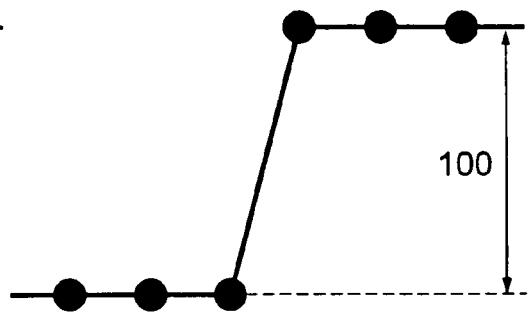
FIG. 6 is an illustration showing an example waveform of a picture signal after filtering process with the ε filter shown in FIG. 1 when the waveform shown in FIG. 5 is inputted.
Figure 25:
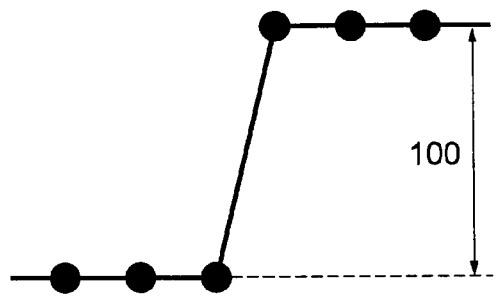
FIG. 25 is an illustration showing an example waveform of a picture signal outputted from the nonlinear filter shown in FIG. 20 when a picture signal shown in FIG. 5 is inputted, according to the second embodiment of the present invention.
Figure 26:
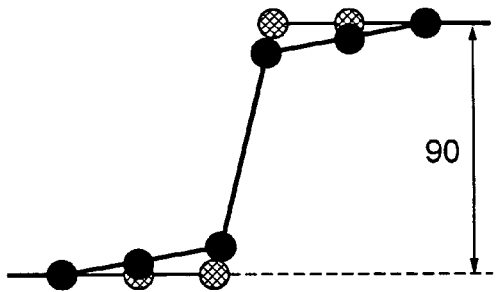
FIGS. 26 to 28 are illustrations showing example waveforms of the picture signal outputted from the nonlinear filter shown in FIG. 20 when a picture signal having a waveform shown in FIG. 5 is inputted, according to the second embodiment of the present invention.
Figure 27:
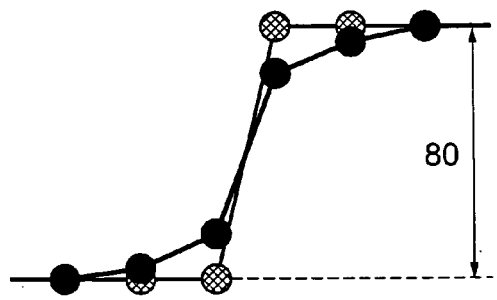

The above is the operation of the nonlinear filter 11. In this nonlinear filter 11, it is assumed that the threshold value ∈1 is set 100 and the threshold value ∈2 is set 70, and that a picture signal represents a waveform including an edge of which pixel value rapidly changes as shown in FIG. 5. In this condition, if the height of the edge is 100 which is equal to the threshold value ∈1, the picture signal outputted from the nonlinear filter 11 shows a waveform in which the configuration of the edge is kept as shown in FIG. 25. If the height of the edge becomes 90 and 80 that is lower than the threshold value ∈1, the picture signal outputted from the nonlinear filter 11 shows a waveform in which the configurations of the edges gradually changes as shown in FIGS. 26 and 27. Further, as the height of the edge becomes lower, the configuration of the edge in the picture signal from the nonlinear filter 11 gradually changes. Then, when the height of the edge agrees with the threshold value ∈2 (70), the waveform of the edge in the picture signal outputted from the nonlinear filter 11 is as shown in FIG. 28.

Figure 7:
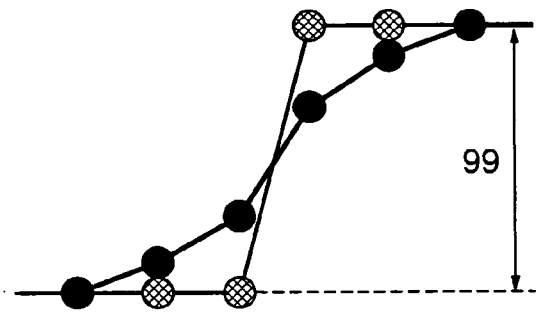
FIG. 7 is an illustration showing an example waveform of a picture signal after filtering process with the ε filter shown in FIG. 1 when the waveform shown in FIG. 5 is inputted.
Figure 8:
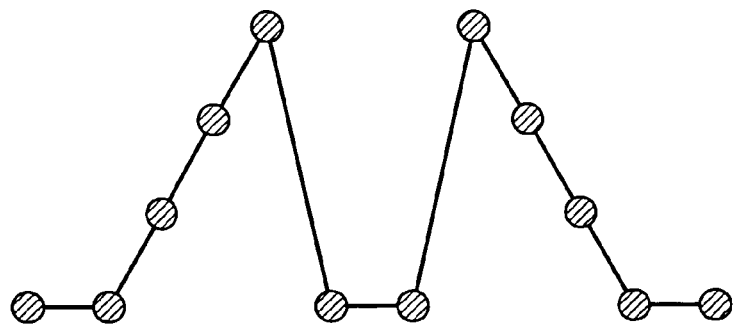
FIG. 8 is an illustration showing a waveform of a picture signal before filtering process.
Figure 9:
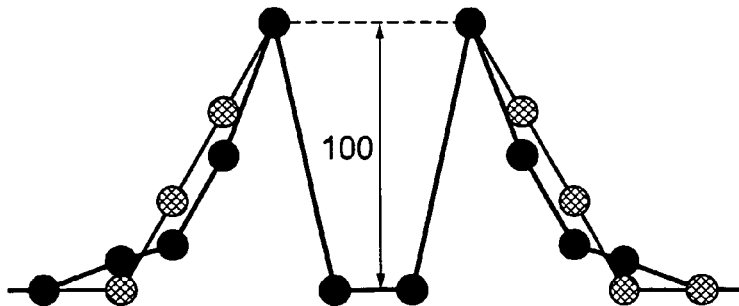
FIG. 9 is an illustration showing an example waveform of a picture signal after filtering process with the ε filter shown in FIG. 1 when the waveform shown in FIG. 8 is inputted.
Figure 28:
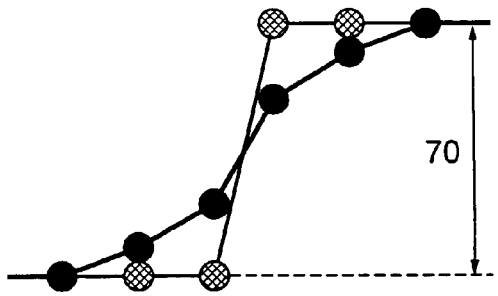

As clearly understood from comparison between FIG. 28 and FIG. 7 illustrating the output of the related art ∈ filter 1, in the ∈ filter 1, when the height of the edge in the input picture signal is 99 that slightly lower than the threshold value (∈=100), as shown in FIG. 7, the waveform of the picture signal at the edge changes largely. On the other hand, in the nonlinear filter 11 according to the present invention, if the height of the waveform of the filtered picture signal at the edge becomes lower than the threshold value ∈1, the waveform gradually changes from the threshold value ∈1 to the threshold value ∈2.

Third Embodiment

Figure 29:
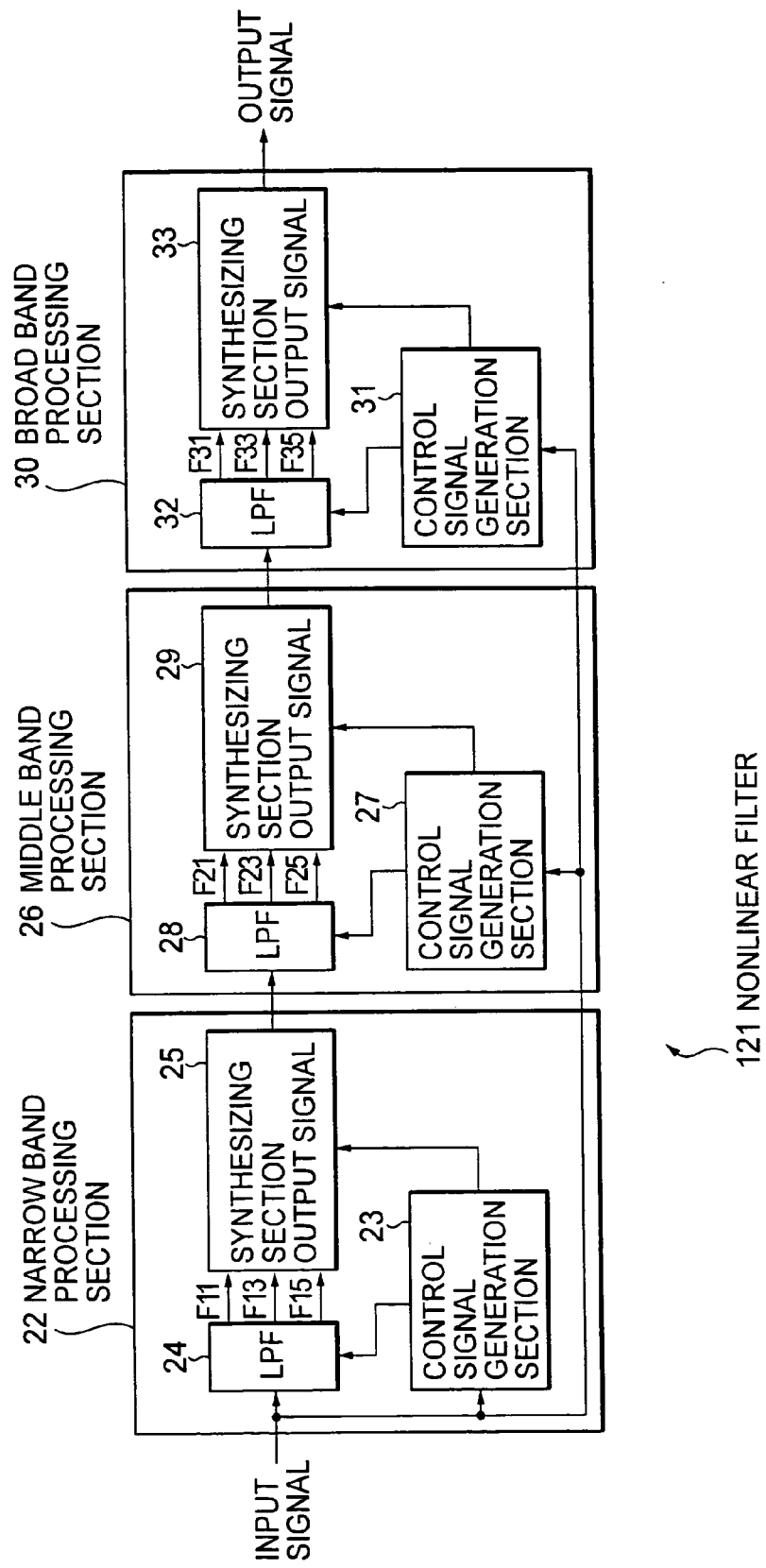
FIG. 29 is a block diagram of a nonlinear filter according to a third embodiment of the present invention.

FIG. 29 illustrates structure of a nonlinear filter 121 according to a third embodiment. The nonlinear filter 121 is used in the picture signal processing apparatus shown in FIG. 13A. The nonlinear filter 121 includes a narrow band processing section 22 for filtering the input picture signal with taps for five pixels, the interval between which is four pixel pitches, a middle band processing section 26 for filtering the output of the narrow band processing section 22 with taps for five pixels, the interval between which is two pixel pitches, and a broad band processing section 30 for filtering the output of the middle band processing section 26 with taps for five pixels, the interval between which is one pixel interval.

The taps having interval of four pixel pitches is shown in FIG. 30. Among pixels arranged in the horizontal direction, the eighth pixel l8 and the fourth pixel l4 at the left of the target pixel C, and the fourth pixel r4 and the eighth pixel r8 at the right of the target pixels C are adjacent pixels L2, L1, R1, and R2 at the interval of four pixel pitches, respectively. The taps are provided to output pixel values for operation.

The taps having interval of two pixel pitches is shown in FIG. 31. Among pixels arranged in the horizontal direction, the fourth pixel l4 and the second pixel l2 at the left of the target pixel C, and the second pixel r2 and the fourth pixel r4 at the right of the target pixels C are adjacent pixels L2, L1, R1, and R2 at the interval of two pixel pitches, respectively. The taps are provided to output pixel values for operation.

The taps having interval of one pixel pitch is shown in FIG. 32. Among pixels arranged in the horizontal direction, the second pixel l2 and the first pixel l1 at the left of the target pixel C, and the first pixel r1 and the second pixel r2 at the right of the target pixels C are adjacent pixels L2, L1, R1, and R2 at the interval of one pixel pitch, respectively. The taps are provided to output pixel values for operation.

Now returning to FIG. 29, the narrow band processing section 22 has the same structure as the nonlinear filter 11 shown in FIG. 20. That is, the control signal generation section 23, the low pass filter 24, and the synthesizing section 25 in the narrow band processing section 22 correspond to the control signal generation section 113, the low pass filter 114, and the synthesizing section 115, respectively. The difference between the narrow band processing section 22 and the nonlinear filter 11 in that, in the nonlinear filter 11, taps with interval of one pixel pitch are set as shown in FIG. 21, but, in the narrow band processing section 22, the taps with interval of four pixel pitches are set as shown in FIG. 30.

The middle band processing section 26 also has the same structure as the nonlinear filter 11 shown in FIG. 20. That is, the control signal generation section 27, the low pass filter 28, and the synthesizing section 29 in the middle band processing section 26 correspond to the control signal generation section 113, the low pass filter 114, and the synthesizing section 115, respectively. The difference between the middle band processing section 26 and the nonlinear filter 11 in that, in the middle band processing section 26, the taps with interval of two pixel pitches are set as shown in FIG. 31.

The broad band processing section 30 also has the same structure as the nonlinear filter 11 shown in FIG. 20. That is, the control signal generation section 31, the low pass filter 32, and the synthesizing section 33 in the broad band processing section 30 correspond to the control signal generation section 113, the low pass filter 114, and the synthesizing section 115, respectively. The difference between the broad band processing section 30 and the nonlinear filter 11 in that in the broad band processing section 30, the taps with interval of one pixel pitch are set as shown in FIG. 32.

FIG. 33 is a table illustrating an example of tap coefficients used in the low pass filter 24 in the narrow band processing section 22, in the low pass filter 28 in the middle band processing section 26, and the low pass filter 32 in the broad band processing section 30.

In the low pass filter 24, taps with interval of four pixel pitches are provided, and the smoothed signal F11 is operated in which tap coefficients {0, 0, 1, 0, 0} are used in the same manner as in Eq. (3). This operation corresponds to weight-averaging in the ε filter 1 shown in FIG. 1 in which taps are provided for seventeen pixels, and tap coefficients {0, 0, 0, 0, 0, 0, 0, 0, 1, 0, 0, 0, 0, 0, 0, 0, 0} are used.

In the low pass filter 24, taps with interval of four pixel pitches are provided and the smoothed signal F13 is operated in which tap coefficients {0, 1, 2, 1, 0} are used in the same manner as in Eq. (4). This operation corresponds to weight-averaging in the ε filter 1 shown in FIG. 1 in which taps are provided for seventeen pixels, and tap coefficients {0, 0, 0, 0, 1, 0, 0, 0, 2, 0, 0, 0, 1, 0, 0, 0, 0} are used.

In the low pass filter 24, taps with interval of four pixel pitches are provided and the smoothed signal F15 is operated in which tap coefficients {1, 2, 2, 2, 1} are used in the same manner as in Eq. (5). This operation corresponds to weight-averaging in the ε filter 1 shown in FIG. 1 in which taps are provided for seventeen pixels, and tap coefficients {1, 0, 0, 0, 2, 0, 0, 0, 2, 0, 0, 0, 2, 0, 0, 0, 1} are used.

Similarly, in the low pass filter 28, taps with interval of two pixel pitches are provided and the smoothed signal F21 is operated in which tap coefficients {0, 0, 1, 0, 0} are used in the same manner as in Eq. (3). This operation corresponds to weight-averaging in the ε filter 1 shown in FIG. 1 in which taps are provided for nine pixels, and tap coefficients {0, 0, 0, 0, 1, 0, 0, 0, 0} are used.

In the low pass filter 28, taps with interval of two pixel pitches are provided and the smoothed signal F23 is operated in which tap coefficients {0, 1, 2, 1, 0} are used in the same manner as in Eq. (4). This operation corresponds to weight-averaging in the ε filter 1 shown in FIG. 1 in which taps are provided for nine pixels, and tap coefficients {0, 0, 1, 0, 2, 0, 1, 0, 0} are used.

In the low pass filter 28, taps with interval of two pixel pitches are provided and the smoothed signal F25 is operated in which tap coefficients {1, 2, 2, 2, 1} are used in the same manner as in Eq. (5). This operation corresponds to weight-averaging in the ε filter 1 shown in FIG. 1 in which taps are provided for nine pixels, and tap coefficients {1, 0, 2, 0, 2, 0, 2, 0, 1} are used.

In the low pass filter 32, taps with interval of one pixel pitch are provided and the smoothed signal F31 is operated in which tap coefficients {0, 0, 1, 0, 0} are used in the same manner as in Eq. (3).

In the low pass filter 32, taps with interval of one pixel pitch are provided and the smoothed signal F33 is operated in which tap coefficients {0, 1, 2, 1, 0} are used in the same manner as in Eq. (4).

In the low pass filter 32, taps with interval of one pixel pitch are provided and the smoothed signal F35 is operated in which tap coefficients {1, 2, 2, 2, 1} are used in the same manner as in Eq. (5).

Operation of Nonlinear Filter 121

First, the filtering process in the narrow band processing section 22 will be described with reference FIG. 23 used in the second embodiment.

In step S11, the control signal generation section 23 successively determines, as a target pixel C, one of pixels forming the input picture signal coming in order in a raster. In step S12, the control signal generation section 23 sets taps with interval of four pixel pitches as shown in FIG. 30, wherein the target pixel is centered.

In step S13, the low pass filter 24 the target pixel C and adjacent pixels L2, L1, R1, and R2 are weighted-averaged with Eqs. (3), (4), and (5) to supply the resultant smoothed signal F11, F13, and F15 to synthesizing section 25.

In step S14, the control signal generation section 23 operates differences |L2−C|, |L1−C|, |R1−C|, and |R2−C| in pixel value between each of the adjacent pixels L2, L1, R1, and R2 and the target pixel C. In addition, the control signal generation section 23 operates differences |l7−C|, |l6−C|, |l5−C|, |l3−C|, |l2−C|, |l1−C|, |r1−C|, |r2−C|, |r3−C|, |r5−C|, |r6−C|, and |r7−C| in pixel value between the target pixel C and each of pixels l7, l6, l5, l3, l2, l1, r1, r2, r3, r5, r6, and r7, not included in the tap, located closer to the target pixel C than the adjacent pixels L2 and R2.

In step S15, the control signal generation section 23 calculates weighting coefficients w1 and w3 used in the synthesizing section 25 on the basis of the differences calculated in step S14.

More specifically, out of differences |L1−C|, |l3−C|, |l2−C|, |l1−C|, |r1−C|, |r2−C|, r3−C|, |R1−C| of the adjacent pixels on the side of the target pixel C within the adjacent pixels L1 and R1 at symmetric positions with respect to the target pixel C, the largest one is substituted for variable d1 as follows:

$$d1=\text{MAX}[|L1-C|,|l3-C|,|l2-C|,|l1-C|,|r1-C|,|r2-C|,|r3-C|,|R1-C|]$$

Then, the weighting coefficient w1 is calculated in accordance with the variable d1 as shown in FIG. 24.

When $d1<\epsilon 2$, $w1=0$

When $\epsilon 2 \leq d1 < \epsilon 1$, $w1=(d1-\epsilon 2)/(\epsilon 1-\epsilon 2)$ When $\epsilon 1 \leq d1$, $w1=1$ Similarly, out of differences |L2−C| |l7−C|, |l6−C|, |l5−C|, |r5−C|, |r6−C|, |r7−C|, and |R2−C| of the adjacent pixels on the side of the target pixel C within the adjacent pixels L2 and R2 at symmetric position with respect to the target pixel C, the largest one is substituted for variable d2 as follows:

$$d2=\text{MAX}[|L2-C|,|l7-C|,|l6-C|,|l5-C|,|r5-C|,|r6-C|,|r7-C|,|R2-C|]$$

Then, the weighting coefficient w3 is calculated in accordance with the variable d2.

When $d2<\epsilon 2$, $w3=0$

When $\epsilon 2 \leq d2 < \epsilon 1$, $w3=(d2-\epsilon 2)/((1-\epsilon 2)$

When $\epsilon 1 \leq d2$, $w3=1$

As mentioned above, the calculated weighting coefficients w1 and w3 are supplied to the synthesizing section 25 as the control signal. In step S16, the synthesizing section 25 synthesizes the smoothed signals F11, F13, and F15 operated by the low pass filter 24 in accordance with Eq. (9) with the weighting coefficients w1 and w3 calculated by the control signal generation section 23 to supply a pixel value C' after filtering for the target pixel C to the middle band processing section 26. This is operation of the filtering process in the narrow band processing section 22.

The picture signal outputted from the narrow band processing section 22 is subjected to a filtering process at the middle band processing section 26 and further subjected to a filtering processing at the broad band processing section 30. Here, because the filtering processes at the middle band processing section 26 and the broad band processing section 30 are similar to the filtering process in the narrow band processing section 22 mentioned above except that the interval of taps are different, their descriptions are omitted.

Figure 34:
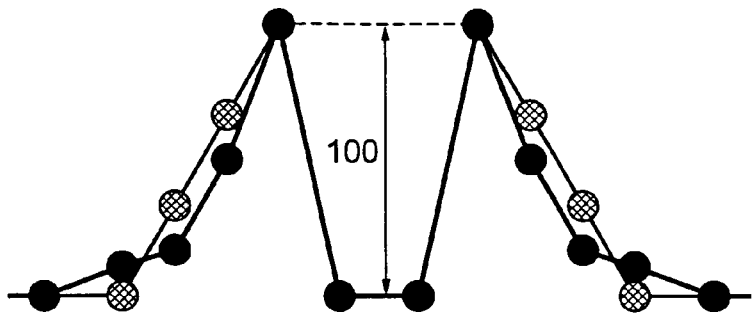
FIGS. 34 to 37 are illustrations showing example waveforms of the picture signal outputted from the nonlinear filter shown in FIG. 29 when a picture signal shown in FIG. 8 is inputted, according to the third embodiment of the present invention.
Figure 35:
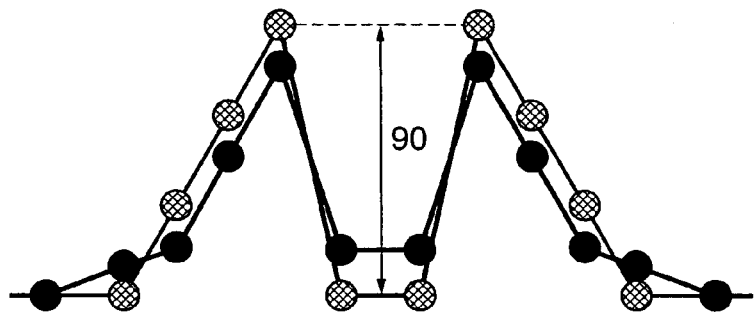
Figure 36:
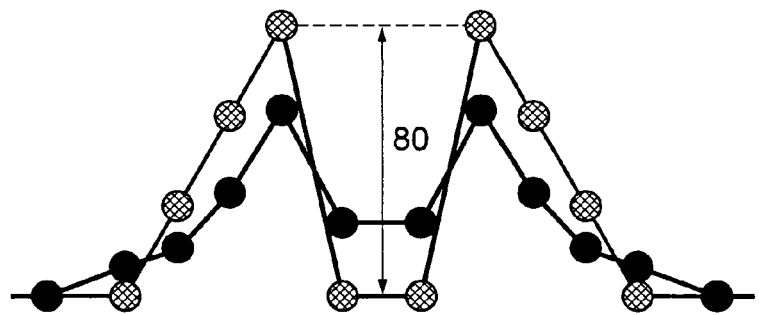

It is assumed that the threshold value ∈1 is set 100 and the threshold value ∈2 is set 70, and that a picture signal represents a waveform including steep edge slopes, the distance between which is within the tap interval of four pixel pitches. In this condition, if the heights of the edges are 100 which are equal to the threshold value ∈1, the picture signal outputted from the nonlinear filter 121 shows a waveform in which the configuration of the edges is kept as shown in FIG. 34. If the heights of the edges become 90 and 80 that are lower than the threshold value ∈1, the picture signal outputted from the nonlinear filter 121 shows a waveform in which the configuration of the edges gradually changes as shown in FIGS. 35 and 36. Further, as the heights of the edges become lower, the configuration of the edges in the picture signal from the nonlinear filnonlinear filter 121 shows a waveform in which the configuration of the edges gradually changes as shown in FIGS. 35 and 36. Further, as the heights of the edges become lower, the configuration of the edges in the picture signal from the nonlinear filter 121 gradually changes. Then, when the heights of the edges agree with the threshold value ∈2 (70), the waveform of the edge in the picture signal outputted from the nonlinear filter 121 is as shown in FIG. 37.

Figure 10:
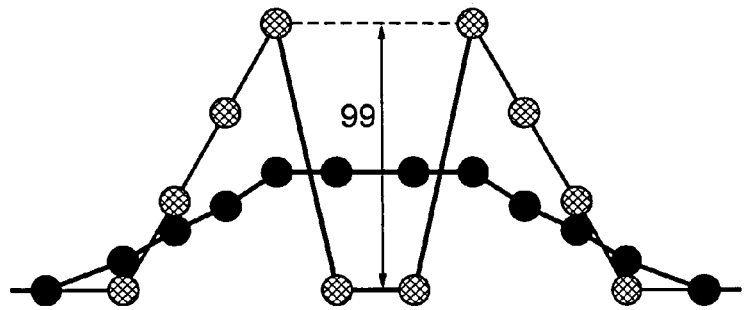
FIG. 10 is an illustration showing an example waveform of a picture signal after filtering process with the ε filter shown in FIG. 1 when the waveform shown in FIG. 8 is inputted.
Figure 37:
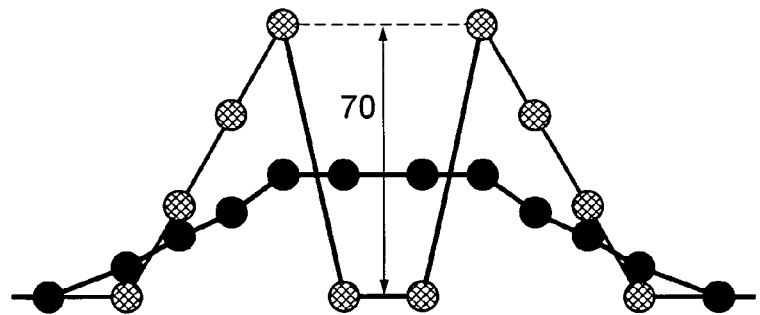

As clearly understood from comparison between FIG. 37 and FIG. 10 illustrating the output of the related art ∈ filter 1, in the ∈ filter 1, though the height of the edge in the input picture signal is 99 that is slightly lower than the threshold value ∈, as shown in FIG. 10, the waveform of the picture signal at the edge changes largely. On the other hand, in the nonlinear filter 121 according to the present invention, though the heights of the edges are lower than the threshold value ∈1, the waveform of the edges in the filtered picture signal at the edges gradually changes as the heights of the edges vary from the threshold value ∈1 to the threshold value ∈2.

In addition, the present invention is applicable to any apparatus dealing with a picture signal, such as video cameras, digital still cameras, printers, displays, and computers and the like.

For example, if the present invention is applied to a computer executing image processing, upon adjusting a contrast of an image, it can provide a high quality contrast-adjusted image with the dynamic range being held. In addition, when images obtained under different illumination conditions are synthesized, it is possible to compensate the difference in contrast components between these images to produce a natural synthesized image.

Figure 38:
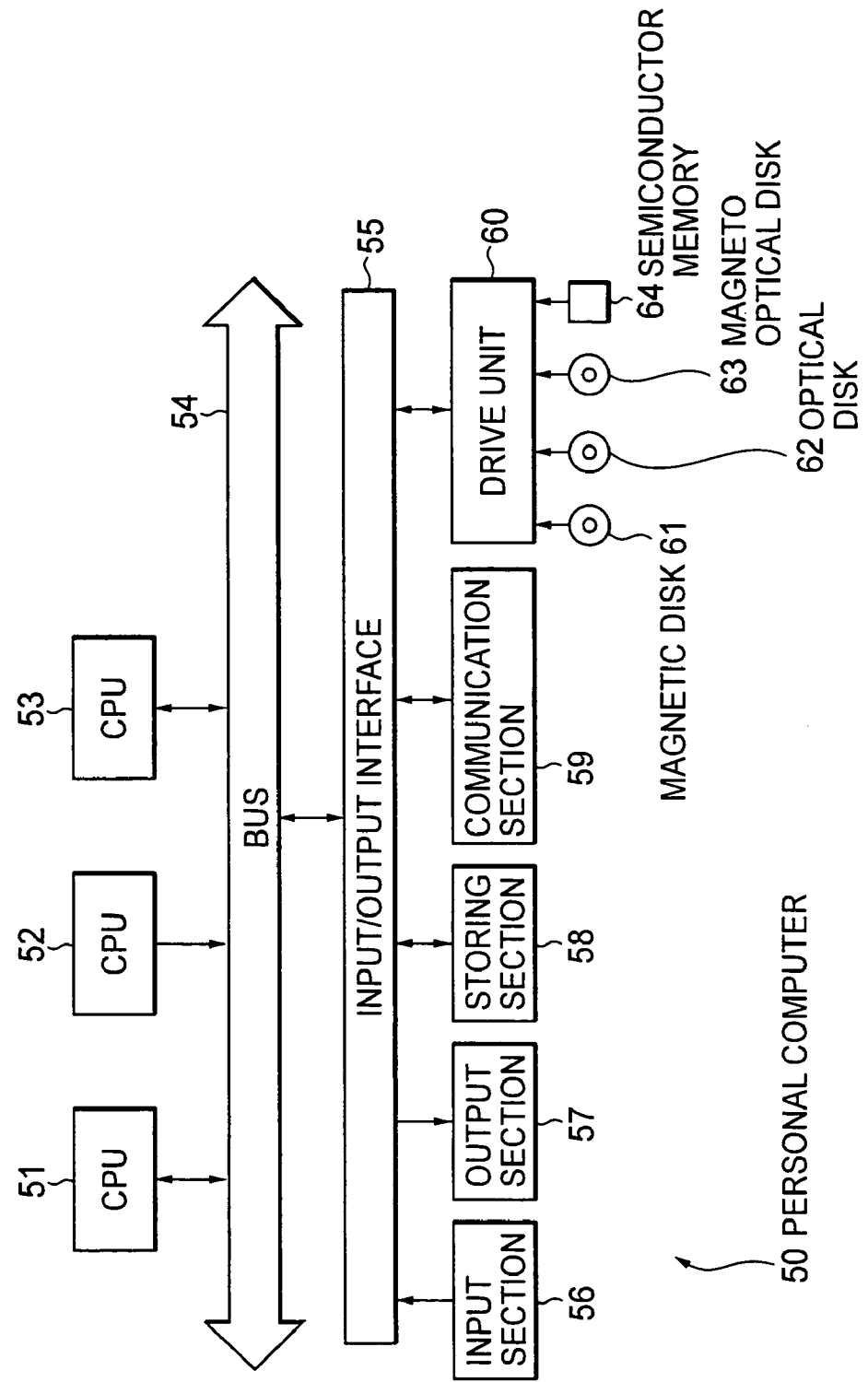
FIG. 38 is a block diagram of a general personal computer to which the present invention is applied.

The above-described processes can be executed with hardware. However, it is also possible to execute the processes using software in addition to hardware. If the process is executed using software, the system is provided with a computer having special hardware storing the programs as software, or provided by installing the programs in a general computer to provide various functions. For example, the programs are installed in a general personal computer having a structure shown in FIG. 38 from a recording medium storing the program.

The personal computer 50 includes a CPU (Central Processing Unit) 51 therein. The CPU 51 is coupled to an input/output interface 55 through a bus 54. The bus 54 is coupled to a ROM (Read Only Memory) 52, and RAM (Random Access Memory) 53.

The input/output interface 55 is coupled to an input section 56 including input devices for inputting operation commands by a user, such as a keyboard, a mouse, and a remote controller, to an output section 57 for supplying the generated video signal to a display, to a storing section 58 for storing programs and various data such as a hard disk drive, and to a communication section 59 including a modem, a LAN (Local Area Network) adopter or the like for executing communication processes through a network such as the Internet. Further, the input/output interface 55 is coupled to a drive unit 60 for reading data from and writing data on recording mediums such as a magnet disk 61 (including flexible disk), an optical disk 62 (including a CD-ROM: Compact Disc-Read Only Memory, and a DVD: Digital Versatile Disc), a magneto optical disc 63 (including MD: Mini Disc), and a semiconductor memory 64.

The program for executing a series of processes mentioned above is supplied to the personal computer 50 with that the program is recorded on either of a magnetic disk 61, an optical disk 62, a magneto optical disc 63, or a semiconductor memory 64, and is read from the recording medium by the drive unit 60. The program read by the drive unit 60 is installed on a hard disk drive in the storing section 58. However, the program may be supplied from the network. The program installed in the storing section 58 is loaded in RAM 53 to execute the program in response to an instruction from the CPU 51 in response to the command inputted to the input section 56 by a user.

In this specification, steps in respective flow charts are executed in order of description. However, this invention also includes processing in which steps are executed in parallel or individually.

The foregoing describes the present invention by giving reference to specific examples of preferred embodiments thereof. However, it should be noted that although not explicitly described or shown in the preferred embodiments presented herein, it should be clear to those of ordinary skill in the art that various and any modifications, variations, combinations, sub combinations, etc. of the embodiments may be devised, which embody the principles and are within the spirit and scope of the of the present invention.

What is claimed is:

1. A signal processing apparatus configured to adjust a signal level of successively arranged signals, said signal processing apparatus comprising a plurality of smoothing units for stepwise smoothing said successively arranged signals, wherein each of said smoothing units comprises:

a specification unit configured to successively specify one of said successively arranged signals as a target signal;

a determination unit configured to determine a plurality of adjacent signals out of said successively arranged signals at a predetermined interval based on said target signal specified by said specification unit;

a flag setting unit configured to calculate differences in level between said target signal and said adjacent signals and between said target signal and signals arranged within said predetermined interval, from said adjacent signals toward said target signal, and determine whether the calculated differences are greater than a threshold value, wherein when at least one of the calculated differences is greater than said threshold value, said flag setting unit sets a flag to a corresponding adjacent signal, corresponding with said one of the calculated differences, as well as to another one of said adjacent signals arranged at a symmetrical position of said corresponding adjacent signal with respect to the target signal, and to adjacent signals arranged beyond said corresponding adjacent signal, when viewed from said target signal's position;

a calculator configured to calculate a plurality of weighted averages of said target signal and said adjacent signals by utilizing a plurality of coefficients and generate a plurality of smoothed signals;

a controller configured to control said calculator to generate said plurality of smoothed signals by using said target signal instead of said adjacent signals having said flags set; and a selector configured to select one among said plurality of smoothed signals as a result of setting by said flag setting unit.

2. The signal processing apparatus according to claim 1, wherein said successively arranged signals comprise pixel values of pixels constituting an image.

3. The signal processing apparatus according to claim 1, wherein determination units included in said plurality of smoothing units have predetermined intervals differing from each other.

4. A signal processing method for adjusting signal levels of successively arranged signals, said signal processing method including a plurality of smoothing steps for stepwise smoothing said successively arranged signals, wherein each of said smoothing steps comprises:

successively specifying one of said successively arranged signals as a target signal;

determining a plurality of adjacent signals out of said successively arranged signals at a predetermined interval based on said target signal;

flag setting step, implemented by a processor of a signal processing apparatus, of said adjacent signals and between said target signal and signals arranged within said predetermined interval from said adjacent signals toward said target signal, and determining whether the calculated differences are greater than a threshold value, wherein when at least one of the calculated differences is greater than said threshold value, said flag setting step sets a flag to a corresponding adjacent signal, corresponding with said one of the calculated differences, as well as to another one of said adjacent signals arranged at a symmetrical position of said corresponding adjacent signal with respect to the target signal, and to adjacent signals arranged beyond said corresponding adjacent signal, when viewed from said target signal's position;

calculating a weighted average of said target signal and said adjacent signals by utilizing a plurality of coefficients and generating a plurality of smoothed signals;

calculating the plurality of smoothed signal said target signal instead of said adjacent signals having said flags set; and selecting one among the plurality of smoothed signals as a result of setting by said flag setting step.

5. A signal processing apparatus configured to adjust a signal level of successively arranged signals, comprising:

a specification unit configured to successively specify one of said successively arranged signals as a target signal;

a determination unit configured to determine a plurality of adjacent signals out of said successively arranged signals at a predetermined interval based on said target signal specified by said specification unit;

an operation unit configured to weight-average said target signal and said adjacent signals with a plurality of sets of different coefficients to compute a plurality of smoothed signals;

a calculator configured to calculate differences in level between said target signals and each of said adjacent signals, comparing said calculated differences with a plurality of different threshold values, and calculating weighting coefficients on the basis of a result of said comparison; and a synthesizer configured to synthesize said plurality of smoothed signals operated by said operation unit in accordance with said weighting coefficients calculated by said calculator.

6. The signal processing apparatus according to claim 5, wherein said successively arranged signals comprise pixel values of pixels constituting an image.

7. The signal processing apparatus according to claim 5, further comprising a plurality of signal processing groups, each including said specification unit, said determination unit, said operation unit, said calculator, and said synthesizer, wherein said plurality of signal processing groups are arranged in series.

8. The signal processing apparatus according to claim 7, wherein said determination units included in said plurality of signal processing groups have said predetermined intervals differing from each other.

9. A signal processing method for adjusting signal levels of successively arranged signals, comprising:

successively specifying one of said successively arranged signals as a target signal;

determining a plurality of adjacent signals out of said successively arranged signals at a predetermined interval based on said target signal specified by said specification step;

operation step of weight-averaging said target signals and a plurality of adjacent signals with a plurality of sets of different coefficients to compute a plurality of smoothed signals;

calculating, with a processor of a signal processing apparatus, differences in level signals, comparing said calculated differences with a plurality of different threshold values, and calculating weighting coefficients on the basis of a result of said comparison; and synthesizing a said plurality of smoothed signals operated in said operation step in accordance with said weighting coefficients calculated in said calculation step.

10. A recording medium containing a program in computer-readable form for adjusting signal levels of successively arranged signals and causing a computer to execute a plurality of smoothing steps of stepwise smoothing said successively arranged signals, wherein each of said smoothing steps comprises:

successively specifying one of said successively arranged signals as a target signal;

determining a plurality of adjacent signals out of said successively arranged signals at a predetermined interval based on said target signal specified in said specification step;

flag setting step of calculating differences in level between said target signal and said adjacent signals and between said target signal and signals arranged within said predetermined interval from said adjacent signals toward said target signal, and determining whether the calculated differences are greater than a threshold value, wherein when at least one of the calculated differences is greater than said threshold value, said flag setting step sets a flag to a corresponding adjacent signal, corresponding with said one of the calculated differences, as well as to another one of said adjacent signals arranged at a symmetrical position of said corresponding adjacent signal with respect to the target signal, and to adjacent signals arranged beyond said corresponding adjacent signal, when viewed from said target pixel's position;

calculation step of calculating a plurality of weighted averages of said target signal and said adjacent signals by utilizing a plurality of coefficients and generating a plurality of smoothed signals;

controlling step of controlling said calculator to generate the plurality of smoothed signal by using said target signal instead of said adjacent signals having said flags set; and selecting step of selecting one among the plurality of smoothed signals as a result of setting by said flag setting step.

11. A recording medium containing a program in computer-readable form for causing a computer to execute a plurality of smoothing steps of a method for adjusting signal levels of successively arranged signals, the method comprising:

successively specifying one of said successively arranged signals as a target signal;

determining a plurality of adjacent signals out of said successively arranged signals at a predetermined interval based on said target signal specified by said specification step;

operation step of weight-averaging said target signals and a plurality of adjacent signals with a plurality of sets of different coefficients to compute a plurality of smoothed signals;

calculating differences in level between said target signals and each of said adjacent signals, comparing said calculated differences with a plurality of different threshold values, and calculating weighting coefficients on the basis of a result of said comparison; and synthesizing said plurality of smoothed signals operated in said operation step in accordance with said weighting coefficients calculated in said calculation step.

12. A signal processing apparatus for adjusting a signal level of successively arranged signals, said signal processing apparatus comprising a plurality of smoothing means for stepwise smoothing said successively arranged signals, wherein each of said smoothing means comprises:

specification means for successively specifying one of said successively arranged signals as a target signal;

determination means for determining a plurality of adjacent signals out of said successively arranged signals at a predetermined interval based on said target signal specified by said specification means;

flag setting means for calculating differences in level between said target signal and said adjacent signals and between said target signal and signals arranged within said predetermined interval, from said adjacent signals toward said target signal, and determining whether the calculated differences are greater than a threshold value, wherein when at least one of the calculated differences is greater than said threshold value, said flag setting means sets a flag to a corresponding adjacent signal, corresponding with said one of the calculated differences, as well as to another one of said adjacent signals arranged at a symmetrical position of said corresponding adjacent signal with respect to the target signal, and to viewed from said target signal's position;

calculation means for calculating a plurality of weighted averages of said target signal and said adjacent signals by utilizing a plurality of coefficients and generating a plurality of smoothed signals;

controller for controlling said calculation means to generate said plurality of smoothed signals by using said target signal instead of said adjacent signals having said flags set; and selecting means for selecting one among said plurality of smoothed signals as a result of setting by said flag setting means.

13. A signal processing apparatus for adjusting a signal level of successively arranged signals, comprising:

specification means for successively specifying one of said successively arranged signals as a target signal;

determination means for determining a plurality of adjacent signals out of said successively arranged signals at a predetermined interval based on said target signal specified by said specification means;

operation means for weight-averaging said target signal and said adjacent signals with a plurality of sets of different coefficients to compute a plurality of smoothed signals;

calculation means for calculating differences in level between said target signal and each of said adjacent signals, comparing said calculated differences with a plurality of different threshold values, and calculating weighting coefficients on the basis of a result of said comparison; and synthesizing means for synthesizing said plurality of smoothed signals operated by said operation means in accordance with said weighting coefficients calculated by said calculation means.

* * * * *